US012589514B2

(12) United States Patent
Villa et al.

(10) Patent No.: US 12,589,514 B2
(45) Date of Patent: Mar. 31, 2026

(54) CAPSULE CUTTING APPARATUS AND METHOD

(71) Applicant: SACMI COOPERATIVA MECCANICI IMOLA SOCIETA' COOPERATIVA, Imola (IT)

(72) Inventors: Fabrizio Villa, Imola (IT); Riccardo Dall'olio, Medicina (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 447 days.

(21) Appl. No.: 18/168,934

(22) Filed: Feb. 14, 2023

(65) Prior Publication Data

US 2023/0264378 A1 Aug. 24, 2023

(30) Foreign Application Priority Data

Feb. 23, 2022 (IT) ........................ 102022000003392

(51) Int. Cl.
*B26F 1/18* (2006.01)
*B26D 1/02* (2006.01)
*B26D 3/08* (2006.01)

(52) U.S. Cl.
CPC .................. *B26F 1/18* (2013.01); *B26D 1/02* (2013.01); *B26D 3/08* (2013.01); *B26F 2210/04* (2013.01)

(58) Field of Classification Search
CPC .......... B26F 2210/04; B26F 1/18; B26F 1/22; B26D 3/08; B26D 7/01; B26D 7/02; B26D 7/06; B26D 7/38; B65D 41/3428
See application file for complete search history.

(56) References Cited

U.S. PATENT DOCUMENTS

2016/0354946 A1 12/2016 Sain

FOREIGN PATENT DOCUMENTS

EP 3936289 A1 1/2022

*Primary Examiner* — Jennifer S Matthews
(74) *Attorney, Agent, or Firm* — LAUBSCHER & FRETWELL, P.C.

(57) ABSTRACT

A cutting apparatus and method are disclosed for making an anti-tamper device of a closing capsule of a container, in which the capsule is fed to a cutting device whilst the capsule is retained between a locking member and a base opposite the locking member, with an annular abutment that is arranged around a rotation axis of the locking member and which is moved from a insertion position in the capsule, before the capsule is cut, to an abutment position, in which the abutment presses the capsule against the cutting device, the abutment being rotatable around a rotation axis that, when the abutment is in the abutment position, is misaligned with respect to the rotation axis of the locking member.

15 Claims, 19 Drawing Sheets

CAPSULE CUTTING APPARATUS AND METHOD

BACKGROUND OF THE INVENTION

The invention relates to a cutting apparatus and method for making incisions on capsules, in particular for capsules made of plastics of the type used to close containers such as for example bottles.

Specifically, but not exclusively, the invention relates to an apparatus and a method for making incisions on capsules to close containers in order to make one or more preferential weakening lines to form an anti-tamper device that is suitable for indicating the initial first opening of the container.

In particular, refers to an apparatus to cut capsules as disclosed in the preamble to the first claim. Such an apparatus is known, for example, from patent application US 2016/0354946A1, which shows a cutting apparatus comprising a base, a locking member and a movable abutment, in which the base is a housing rotated by a motor, the locking member is an idly rotatable pin that is coaxial with the housing, and the movable abutment is a bush that is free to rotate around the rotation axis of the housing so as not to hinder the rotation of the capsule.

Various aspects of the prior art are improvable.

Firstly, it is suspectable to make a cutting apparatus that is able to form the anti-tamper device of a capsule for closing containers with great precision and with a reduced number of production rejects.

Secondly, it is desirable for the action of counteracting the cut, exerted by the movable abutment and suitable for facilitating the formation of the anti-tamper device, is more effective and accurate for each capsule and for a greater operating time, so as to process a great number of capsules without interruptions and with a relatively reduced risk of damaging the capsules and/or of committing cutting errors.

Further, it would be appropriate to provide an apparatus to cut capsules that is provided with relatively high productivity and which, at the same time, is able to ensure the integrity and durability of the various components of the apparatus, in particular components involved in the cutting action.

SUMMARY OF THE INVENTION

One object is to make a cutting apparatus and/or a method that is able to remedy one or more of the aforesaid limits of the prior art.

One object is to provide a cutting apparatus and/or a method that are alternatives to those of the prior art.

One advantage is to permit high precision in the performance of the cut that is suitable for forming the anti-tamper device.

One advantage is to ensure a reduced number of production rejects.

One advantage is to ensure a counteracting action to the cut of the capsule that is particularly effective and accurate for each capsule.

One advantage is to enable a high number of capsules to be processed without interruptions and with a relatively reduced risk of damaging the capsules.

One advantage is to provide an apparatus and/or a method for cutting caps with relatively high productivity, ensuring the integrity and the durability of the mechanical components involved in the cutting action.

One advantage is to propose a cutting apparatus and/or a method particularly appropriate also for producing capsules of tethered type.

One advantage is to make available a cutting apparatus for capsules that is constructionally simple and cheap.

Such objects and advantages, and still others, are achieved by an apparatus and/or a method according to one or more of the claims set out below.

In one embodiment, a cutting apparatus, suitable for making an anti-tamper device of a closing capsule of a container, comprises a cutting device for cutting a skirt portion of the capsule, a locking member that is insertable inside the skirt portion and a base opposite the locking member such that the capsule is retained axially between the locking member and the base whilst it is cut, an abutment, in particular of annular shape, which is arranged around a rotation axis of the locking member and which can be moved, in particular at the command of a cam arrangement, between an insertion position, in which the abutment is insertible axially into the skirt portion of the capsule before the skirt portion is cut, and an abutment position, in which the abutment presses the skirt portion laterally against the cutting device, the abutment being rotatable around a rotation axis that, when the abutment is in the aforesaid abutment position, is misaligned with respect to the rotation axis of the locking member.

The abutment, during the cutting step (i.e. when the abutment interacts with the capsule to act as a abutting member counteracting the action of the cutting device), is positioned eccentrically with respect both to the capsule and the upper locking member and with respect to the lower base, in particular by rotating around a rotation axis (abutment axis) which is eccentric, or misaligned, with respect to the rotation axis of the upper locking member and/or with respect to the rotation axis of the lower base and/or with respect to the geometric axis of the capsule. The abutment may be, in particular, rotatable in an idling manner around its rotation axis (abutment axis), or in a controlled manner by a motor-driven control system.

The aforesaid motor-driven control system may comprise, in particular, a transmission for transmitting the motion of the locking member (i.e. the motion of the spindle) to the abutment and/or a transmission for transmitting the motion of the carousel to the abutment directly, i.e. by a kinematic chain that does not include the locking member (i.e. that does not include the spindle).

The cutting apparatus may comprise, in particular, at least one horizontal blade for performing at least one horizontal cut (and/or at least one vertical and/or oblique blade to perform at least one vertical and/or oblique cut).

The cutting apparatus may be used, in particular, also on a capsule without knurling, i.e. devoid of knurling configured to couple with a corresponding fixed coupling surface (in particular a coupling surface that extends in length parallel to the horizontal blade) to facilitate rolling of the capsule.

The cutting apparatus may operate, in particular, by maintaining the geometric axis of the capsule coaxial with the rotation axis (upper axis) of the locking member (or pin or tip or lower spindle portion).

The upper axis, or rotation axis of the locking member (i.e. the rotation axis of the spindle), may be, in particular, rotated by the rotation of a carousel that conveys the capsule, with a transmission ratio determined so as to obtain an appropriate cut. The upper axis, or rotation axis of the locking member (i.e. the rotation axis of the spindle), may be, in particular, rotated by a motor that is distinct and independent of other motor that rotates the carousel.

The cutting apparatus can be particularly advantageous in the case of capsules with a shape that is such as not to allow the upper locking member (or pin or tip or spindle portion) to intervene on the side wall of the capsule, i.e. when the upper locking member has a relatively reduced diameter in order not to interfere with the capsule.

The cutting apparatus enables the capsule to be maintained coaxial with the upper locking member, which may be configured to rotate the capsule, whilst an abutment, in particular of annular shape, may be arranged in a misaligned position compared with the capsule and with respect to the upper locking member to interact in contact with the side wall of the capsule.

The cutting apparatus may comprise, in particular, at least one vertical and/or oblique blade to perform at least one vertical and/or oblique cut and may be configured, in particular, to control the rotation of the abutment around its axis (abutment axis) in a manner coordinated with the movement of the capsule, so that the rotation of the abutment is angularly in phase with the position of the cutting device, in particular by an abutment axis that (does not rotate in an idling manner but) is connected to a motor-driven control system.

This control system could comprise, in particular, a motor that rotates a conveying carousel of the capsules. The abutment axis could be connected to a motor, in particular, by at least one transmission (for example a mechanical, in particular a gear transmission).

The transmission could be configured, in particular, to transmit the motion from a rotation axis of the carousel to the rotation axis of the locking member (upper axis) or the motion from a rotation axis of the carousel to the rotation axis of the abutment (abutment axis) or the motion from a rotation axis of the carousel to both the axes (for example with a transmission portion that transmits the motion from the carousel axis to the upper axis and another transmission portion that transmits the motion from the upper axis to the abutment axis, or with a transmission portion that transmits the motion from the carousel axis to the upper axis and another transmission portion that transmits the motion from the carousel axis to the abutment axis without passing through the upper axis).

The aforesaid "phasing" between the abutment and cutting device may be obtained, in particular, owing to the aforesaid transmission that enables the abutment to receive a rotation motion, in coordination with the supply motion, in a controlled manner.

It is further possible to provide for the upper locking member being idling or the abutment being motor driven (controlled by a motor).

The transmission may be configured, in particular, so as to obtain a transmission ratio that is suitable and stable both in an acceleration step and in a deceleration step of the capsule-cutting apparatus.

The abutment may comprise, in particular, at least one bush-shaped portion. The abutment may have a geometry that is such that the rotation speed of the upper locking member is different from the rotation speed of the abutment. In this regard, it is noted that in the case of knurled capsules, rolling of the capsule on the cutting device may be controlled by knurled coupling, so that cutting can occur in an appropriate manner.

When the abutment is rotated by the carousel, by a transmission (in particular mechanical, for example gear transmission) that connects the carousel axis to the abutment axis without passing through the upper axis, the rotation of abutment is substantially disconnected from the rotation of the locking member, so as to reach a desired specific rotation speed for the locking member (with the motor-driven upper axis) and a desired specific rotation speed for the abutment (with the abutment axis that is also motor-driven without however receiving the motion from the upper axis). In particular, the abutment can rotate and interact with the capsule, maintaining the desired "phasing", i.e. the desired angular orientation, with respect to the cutting device, so that it is possible, for example, to make with precision and repeatability a vertical and/or oblique cut, also on a capsule devoid of knurling.

It is in particular possible to provide in the cutting apparatus, for the lower base (opposite the upper locking member) rotatably idling around a lower axis (coaxial with the upper axis), and for the capsule to be centred axially and retained between the base and the locking member. In the case of motor-driven control of the locking member, the capsule can be rotated by the locking member, for example by frontal friction.

BRIEF DESCRIPTION OF THE DRAWINGS

The invention can be better understood and actuated with reference to the attached drawings that illustrate embodiments thereof by way of non-limiting example in which.

DETAILED DESCRIPTION

Figure 1:
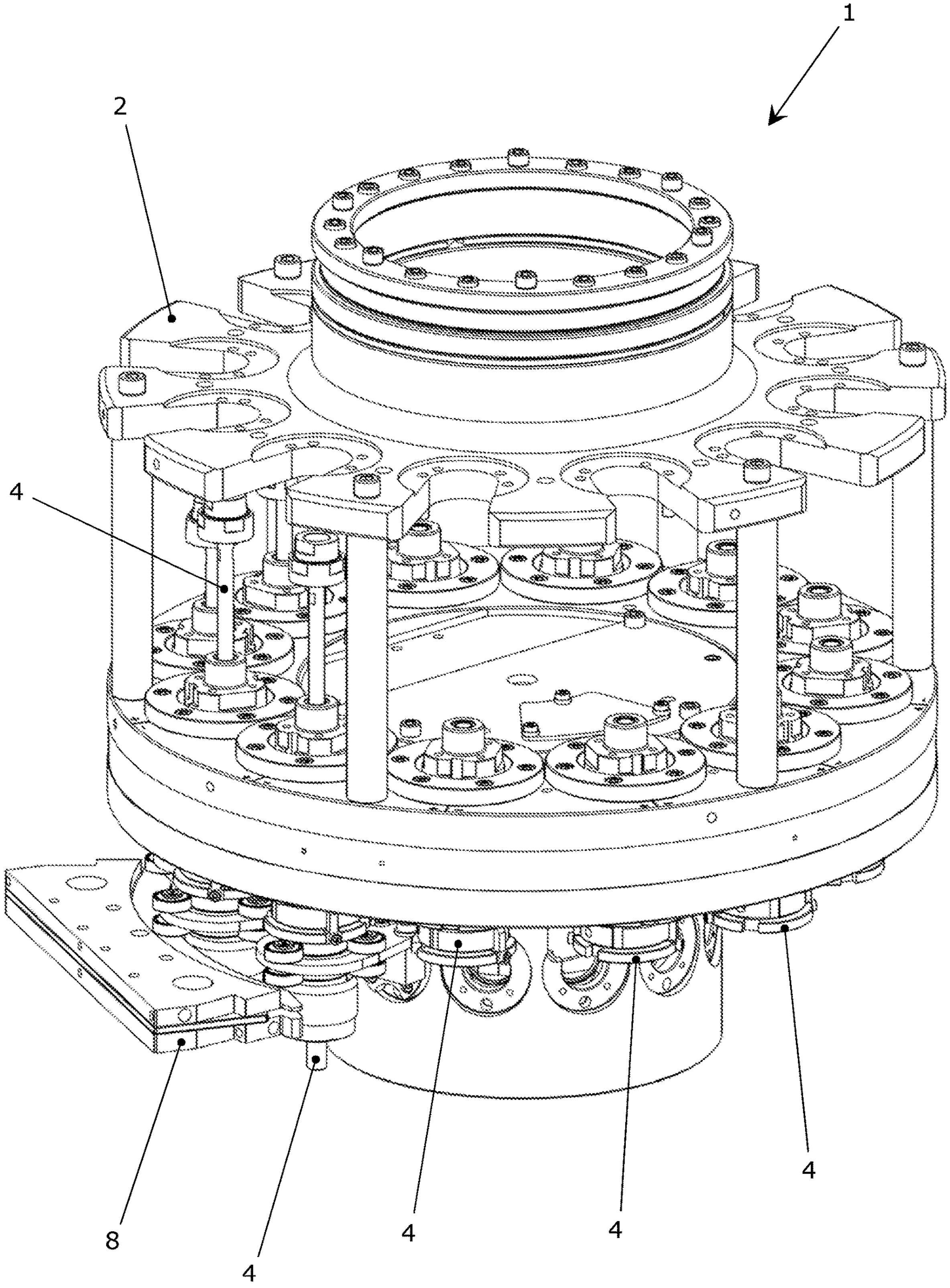
FIG. 1 is a perspective view of a first embodiment of a cutting apparatus made according to the invention, in which the annular abutment is rotatable around its rotation axis in an idling manner.
Figure 2:
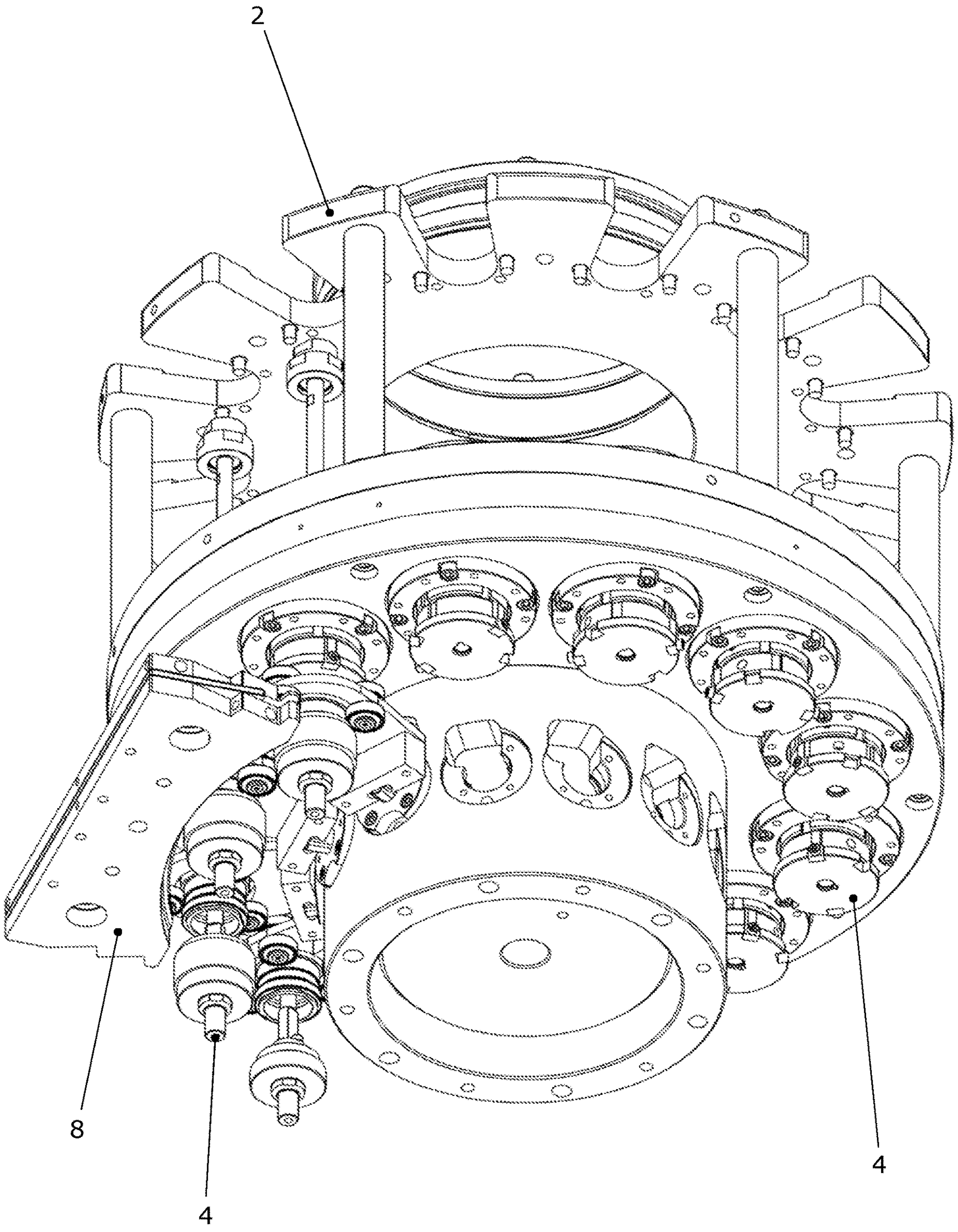
FIG. 2 is a view of the apparatus of FIG. 1 in another perspective.
Figure 3:
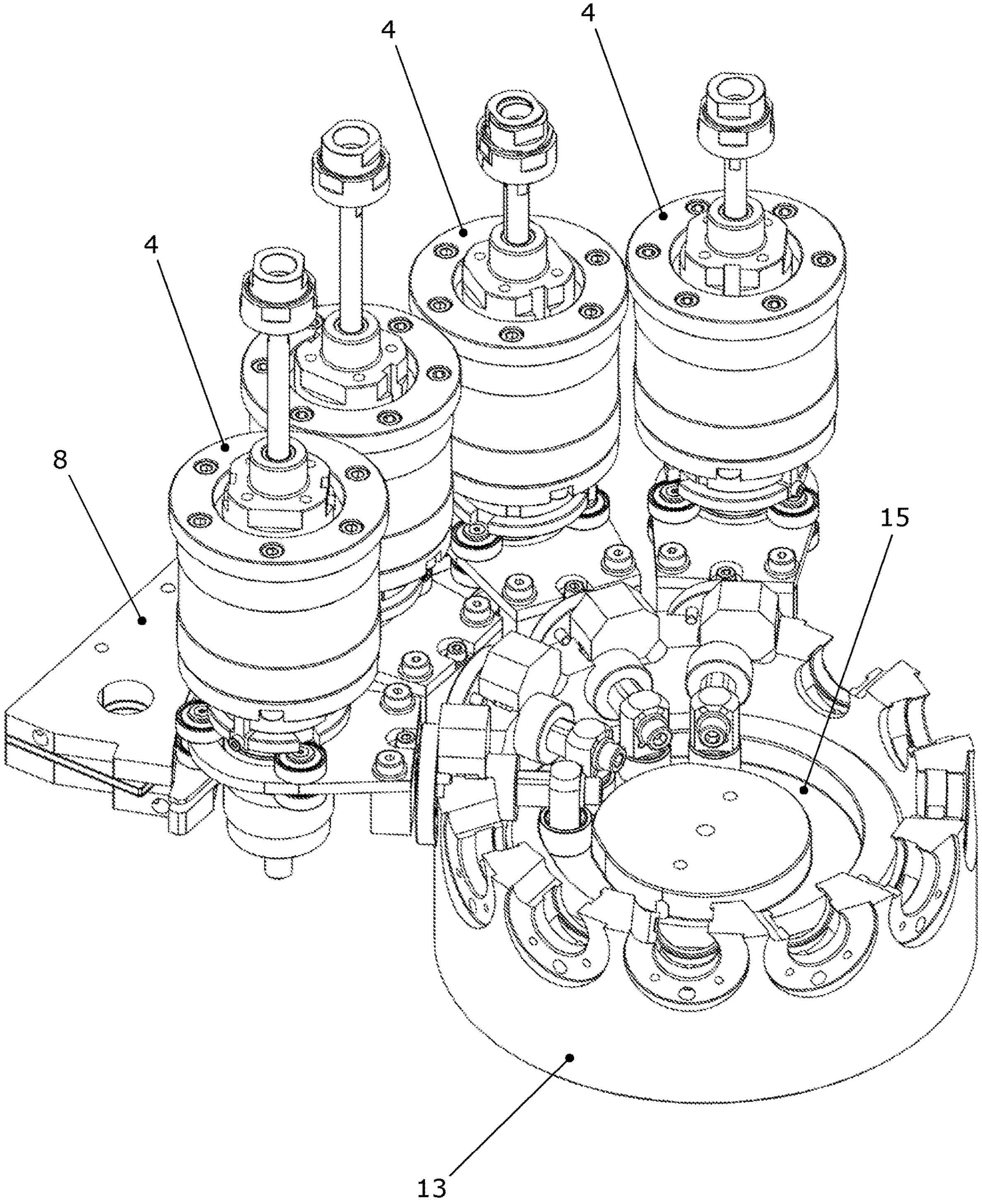
FIG. 3 is a perspective view of the apparatus of FIG. 1 with certain parts removed to show others better.

With reference to the aforesaid figures, with 1 a cutting apparatus has been indicated overall for cutting capsules, in particular for cutting capsules in which each capsule comprises a closing portion for closing a container and a skirt portion for surrounding a neck of the container.

The cutting apparatus 1 may comprise, in particular, a carousel 2 that is rotatable around a carousel axis. The carousel axis may be, in particular, vertical, as in these embodiments. The cutting apparatus 1 may comprise, in particular, a motor (for example, an electric motor) to rotate the carousel axis.

The cutting apparatus 1 may comprise, in particular, two or more transport units 4 rotated by the carousel 2. Each transport unit may be, in particular, configured to transport a capsule 5 along a path (at least partially circular) defined by a rotation of the carousel 2.

Each transport unit 4 may comprise, in particular, a base 6 and a locking member 7 arranged above the base 6. The base 6 may be, in particular, rotatable around a lower axis (or rotation axis of the base 6). The base 6 may be, in particular, configured to receive restingly a capsule 5 with the closing portion of the capsule facing downwards, i.e. to the base 6. The base 6 may comprise, in particular, a rest element in form of a plate or cup or glass or yet another shape. The base 6 may be, in particular, rotatable around the lower axis in an idling manner. The base 6 may be provided, in particular, with a suction retaining device for retaining the capsule 5.

The locking member 7 may be, in particular, rotatable around an upper axis (or rotation axis of the locking member 7). The upper axis may be rotated by a motor. In particular, the cutting apparatus 1 may comprise a motor 3 (for example, a single electric motor, as in these embodiments) to rotate the upper axes, i.e. the rotation axes of the locking members 7. It is possible to provide, in particular, for the motor rotating the carousel axis be distinct and independent of the motor 3 that rotate the locking members 7.

The upper axis may be, in particular, coaxial with the aforesaid lower axis. The upper axis and the lower axis are carried by the carousel 2, together with the respective transport unit 4, so as to perform a circular feeding motion around the carousel axis.

The locking member 7 may be, in particular, configured to be inserted into the capsule 5 inside the skirt portion such that the closing portion of the capsule 5 can be retained between the locking member 7 and the base 6 at least in one portion of the path of the capsule 5.

The cutting apparatus 1 may comprise, in particular, a cutting device 8 arranged along the path of the capsule 5 to cut the skirt portion of a capsule transport ed by a transport unit 4 whereas the capsule rolls on the cutting device 8. The cutting device 8 may be, in particular, configured to make one or more preferential weakening lines on the capsule so as to form an anti-tamper device that is suitable for providing proof that the first opening of a container has occurred. The cutting device 8 may be, in particular, configured to make capsules of "tethered" type, which remain attached to the container after opening.

Figure 4:
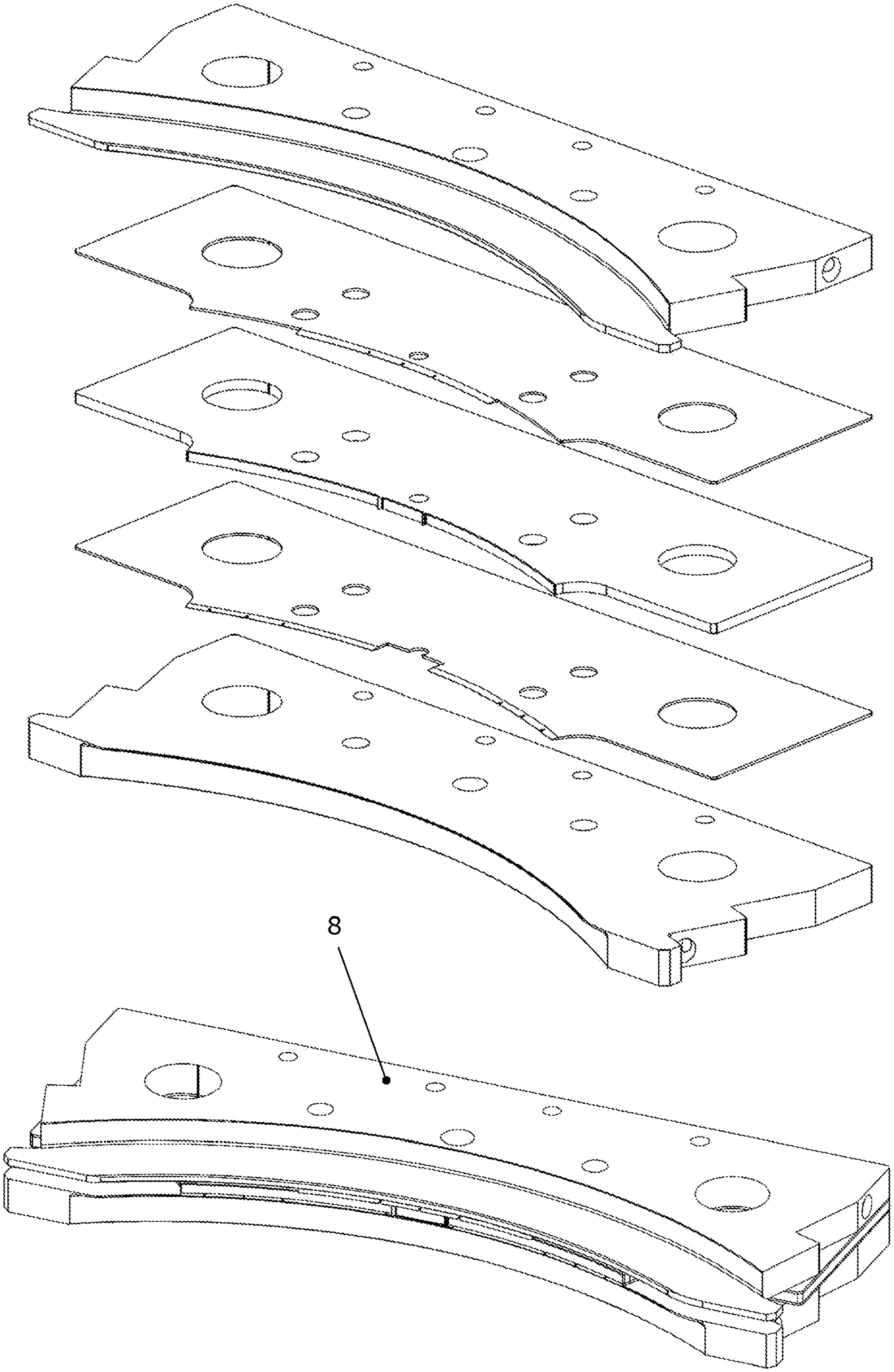
FIG. 4 shows, above, an exploded view of the cutting device of the apparatus of FIG. 1 and, below, the cutting device in an assembled configuration.
Figure 5:
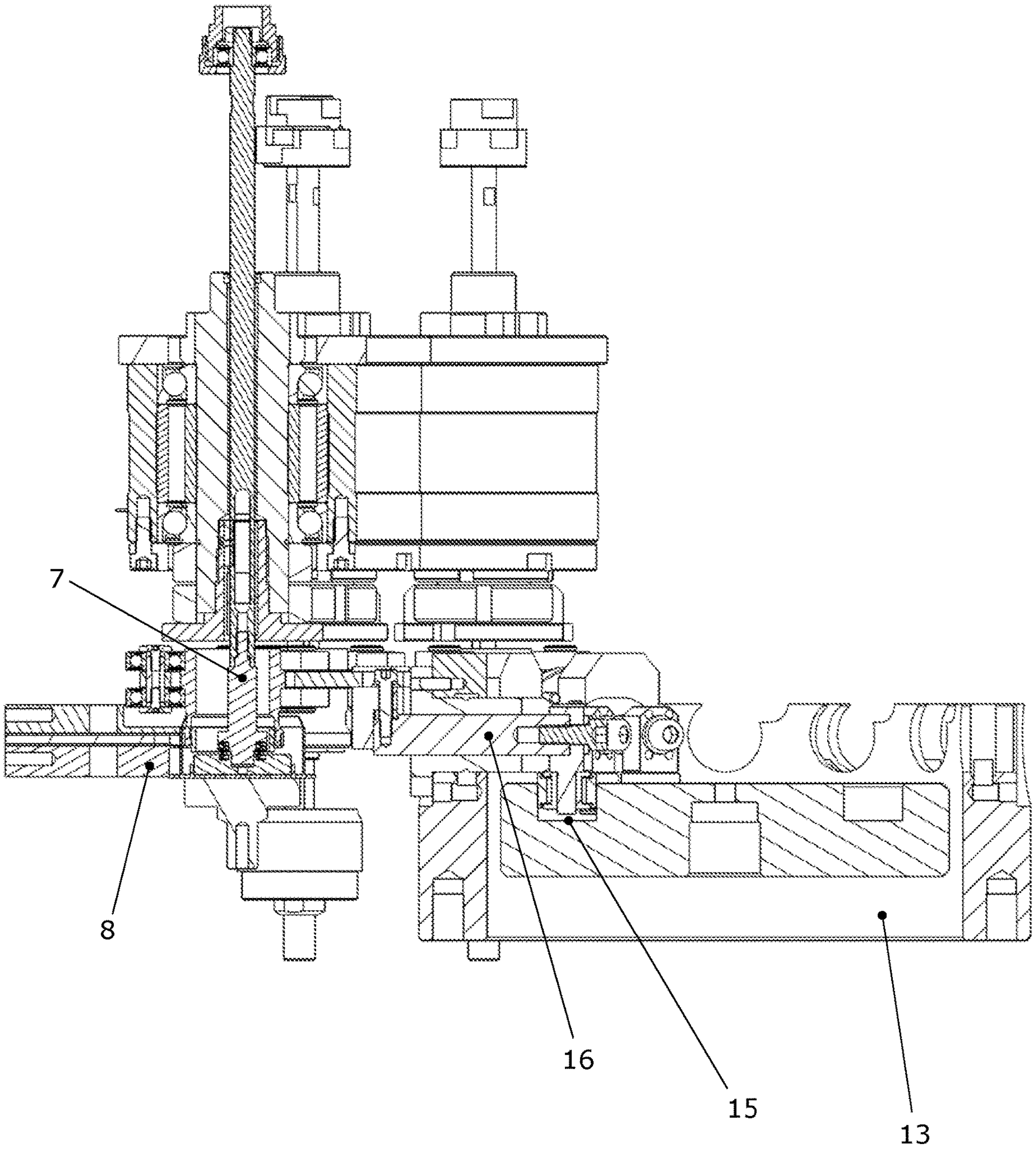
FIG. 5 is a section in a vertical elevation of the apparatus of FIG. 1.

The cutting device 8 may comprise, in particular, as illustrated in the embodiment of FIG. 4, one or more horizontal blades, in particular horizontal blades extending along a circumferential direction, and one or more vertical or oblique blades. The aforesaid blades may be, in particular, arranged on plate bodies that may in turn be arranged stacked on one another.

Figure 6:
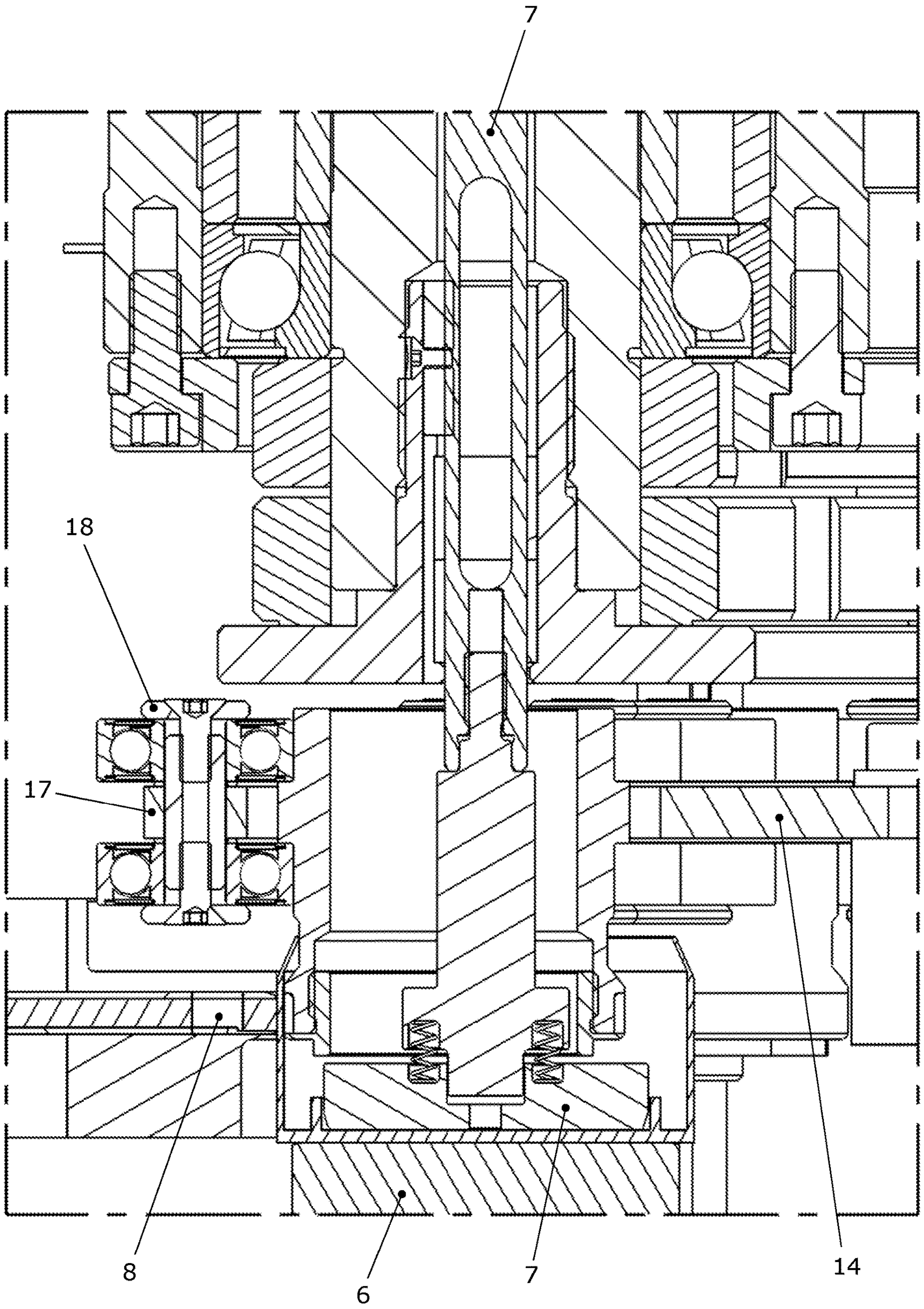
FIG. 6 shows an enlarged detail of FIG. 5 at a zone of the path of a capsule in which cutting of the capsule occurs.
Figure 7:
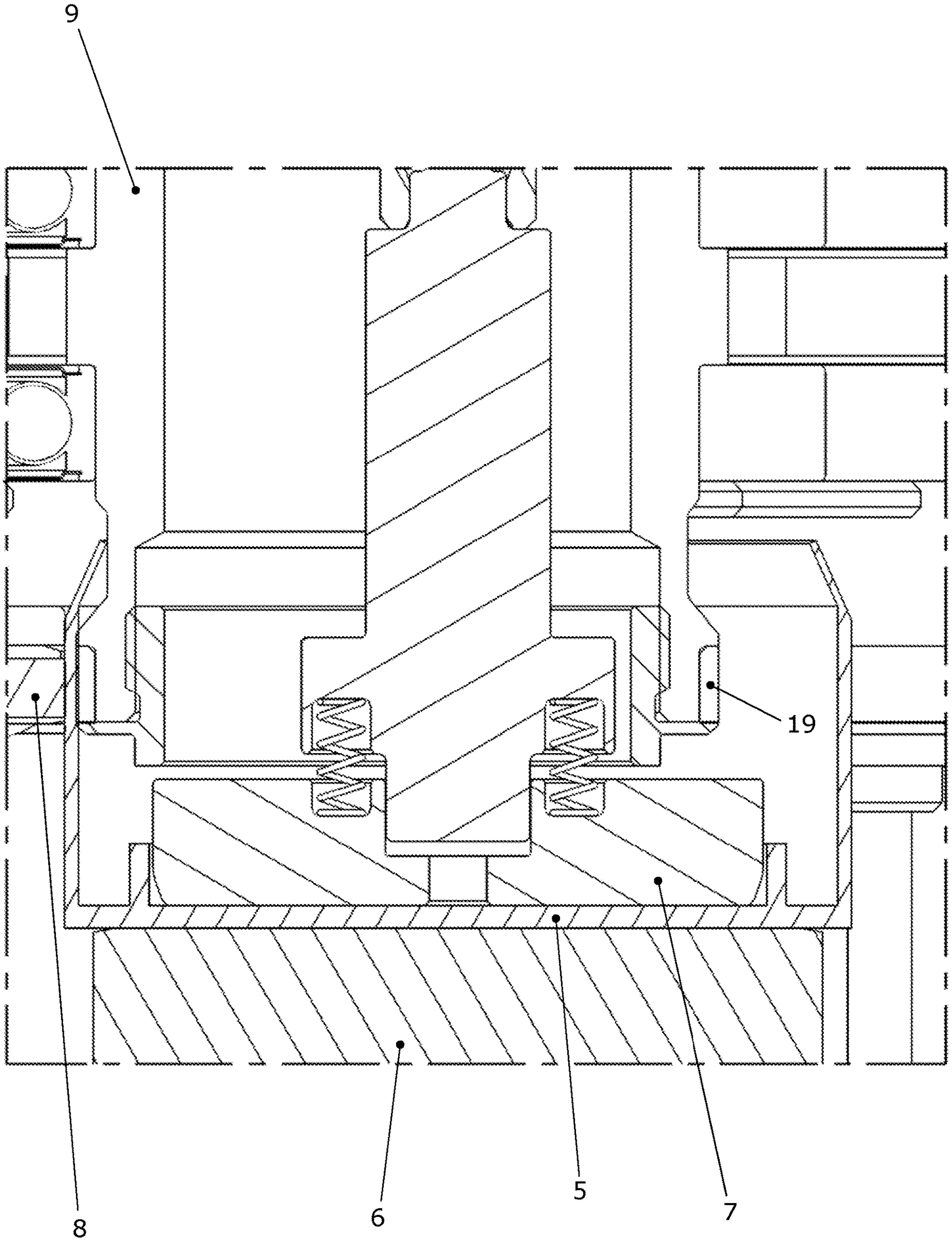
FIG. 7 shows an enlarged detail of FIG. 6.
Figure 8:
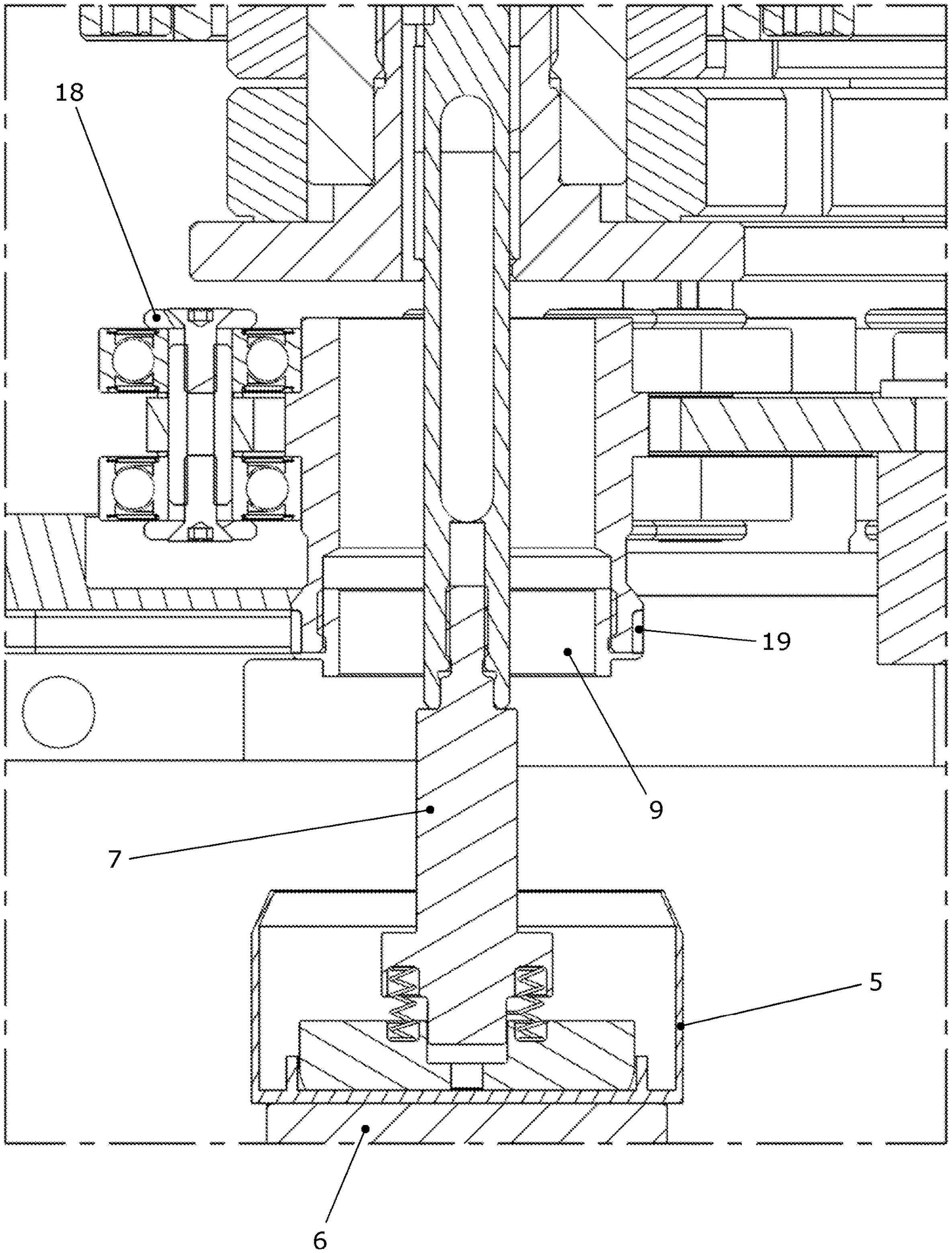
FIG. 8 shows the detail of FIG. 6 at a zone of the path of a capsule where the capsule is not cut, with the abutment that is positioned outside the capsule.
Figure 9:
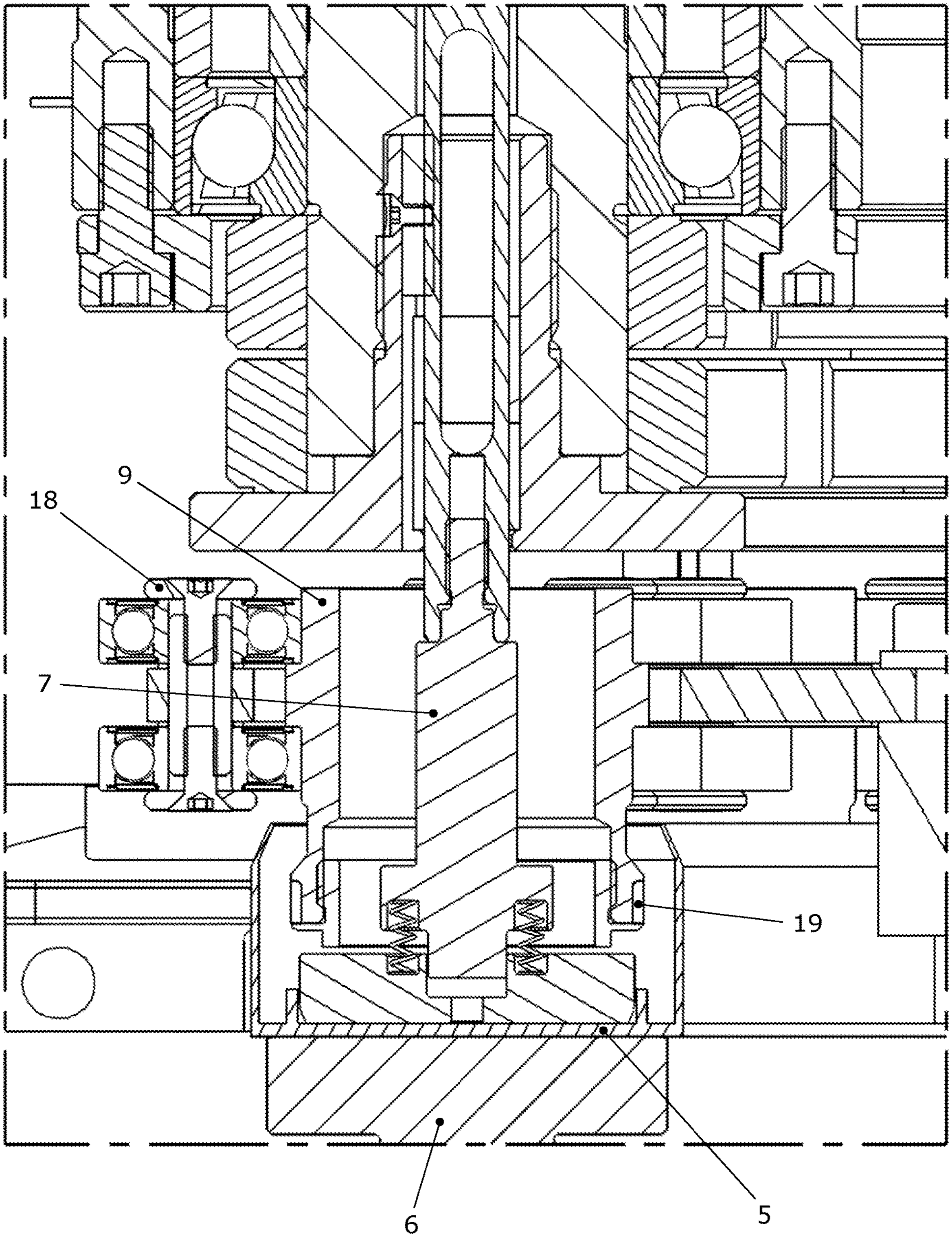
FIG. 9 shows the detail of FIG. 6 at a zone of the path of a capsule where the capsule is not cut, with the abutment that is positioned inside the capsule.
Figure 10:
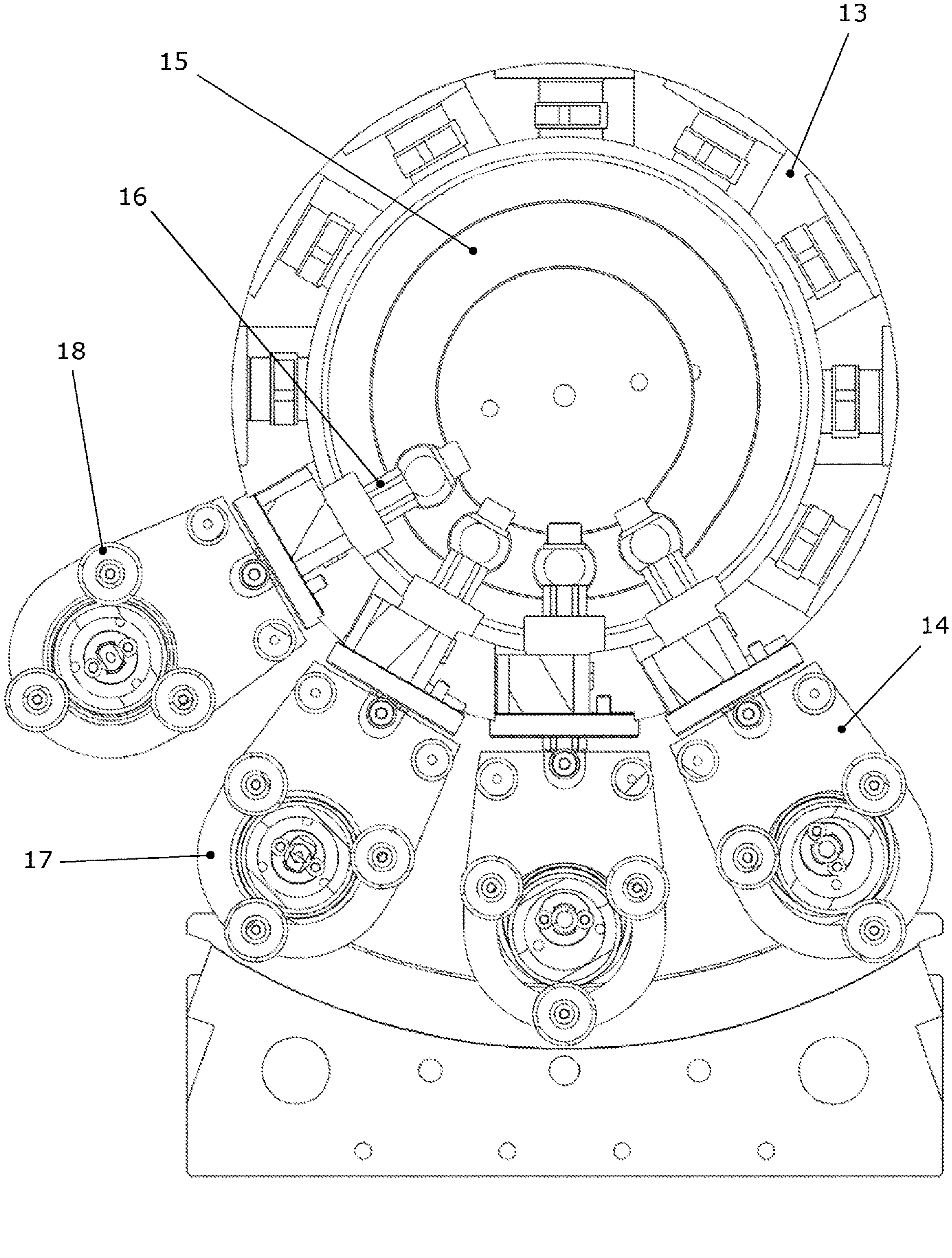
FIG. 10 is a partial top plan view of the apparatus of FIG. 1.

The cutting apparatus 1 may comprise, in particular, for each transport unit 4, an abutment 9 (in particular with at least one abutment portion of annular shape) carried by the carousel 2 and arranged at least partially in a ring around the upper axis of the respective locking member 7. The abutment 9 may be, in particular, movable in a radial direction, where "radial" refers to the (vertical) rotation axis of the carousel 2. The abutment 9 may be movable, in particular, with the possibility of adopting a abutment position (see for example in FIG. 6), in which the abutment 9 can press the skirt portion of the capsule 5 against the cutting device 8 whilst the capsule rolls on the cutting device 8 and the skirt portion of the capsule is cut. The abutment 9 may be movable, in particular, with the possibility of adopting an insertion position, in which the abutment 9 can be inserted into the skirt portion of the capsule before the skirt portion is cut and can be removed from the skirt portion of the capsule after the skirt portion has been cut (see for example in FIG. 8, in which the capsule 5 is lowered before insertion into the abutment 9 or after removal and the abutment 9 is positioned outside the capsule 5, or in FIG. 9, in which the capsule 5 is lifted and the abutment 9 is positioned inside the capsule 5).

For each transport unit 4, the respective abutment 9 may be, in particular, rotatable around a respective abutment axis (or rotation axis of the abutment 9). Each abutment axis may be, in particular, movable in a radial direction with respect to the respective upper axis (of the locking member 7) with the possibility of adopting an eccentric position in which the abutment axis is misaligned with respect to the upper axis (see for example in FIG. 6). The eccentric or misaligned position is adopted, in particular, when the abutment 9 is in the aforesaid abutment position.

It is possible to provide, as in the specific embodiment of the apparatus of FIG. 1, for the abutment 9, for each transport unit 4 being rotatable in an idling manner around the respective abutment axis. In other embodiments (see cutting apparatuses of FIGS. 11 and 16), it is possible to provide for the rotation of the abutment 9 around the respective abutment axis being controlled by a control system, at least in one portion of the path of the capsule 5, as will be explained better below.

Figure 16:
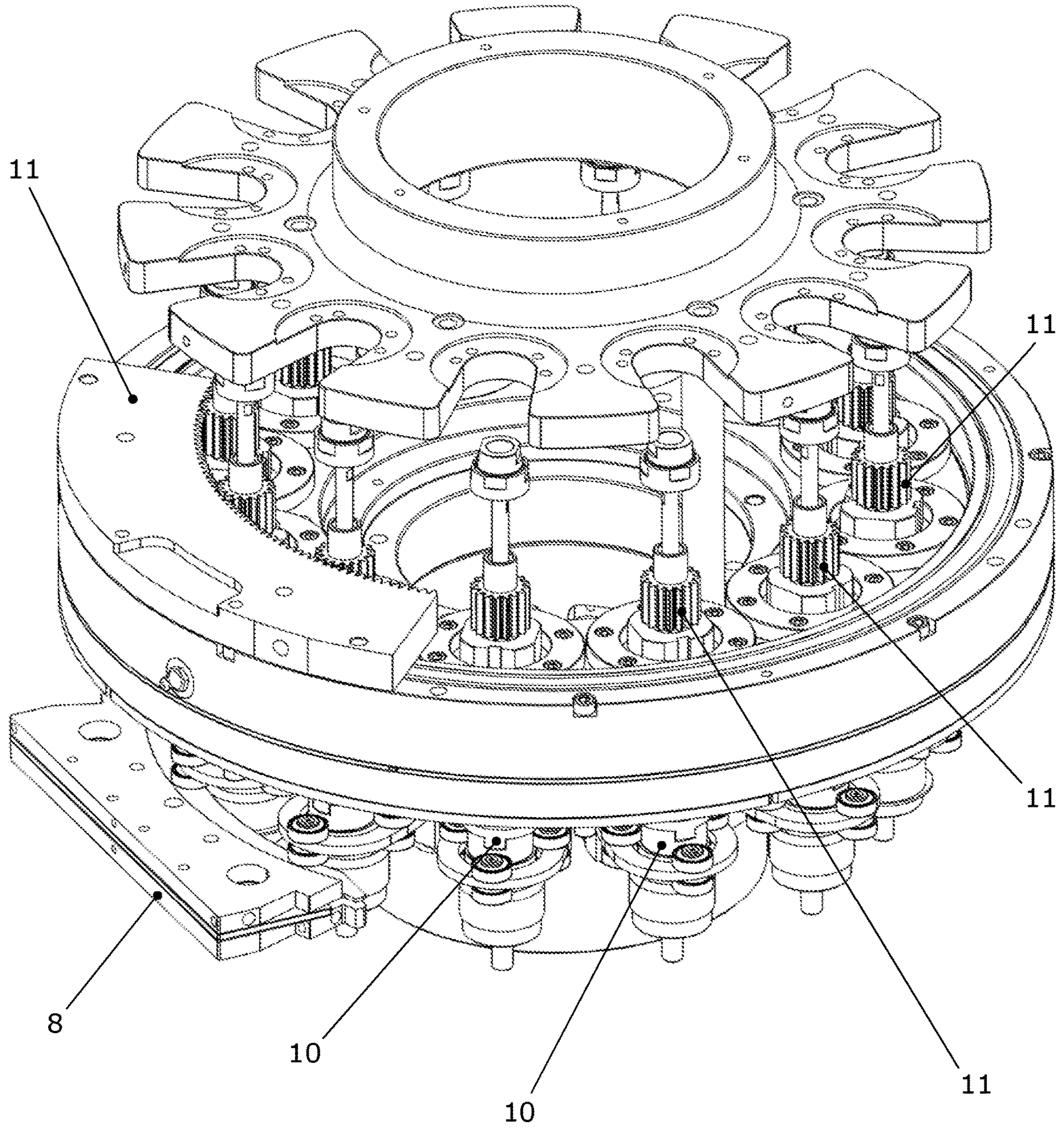
FIG. 16 is a perspective view of a third embodiment of a cutting apparatus made according to the invention, in which each abutment is rotated around its rotation axis by the respective locking member, which in turn rotates around its rotation axis receiving the motion from the rotation of the carousel by a gear transmission.
Figure 17:
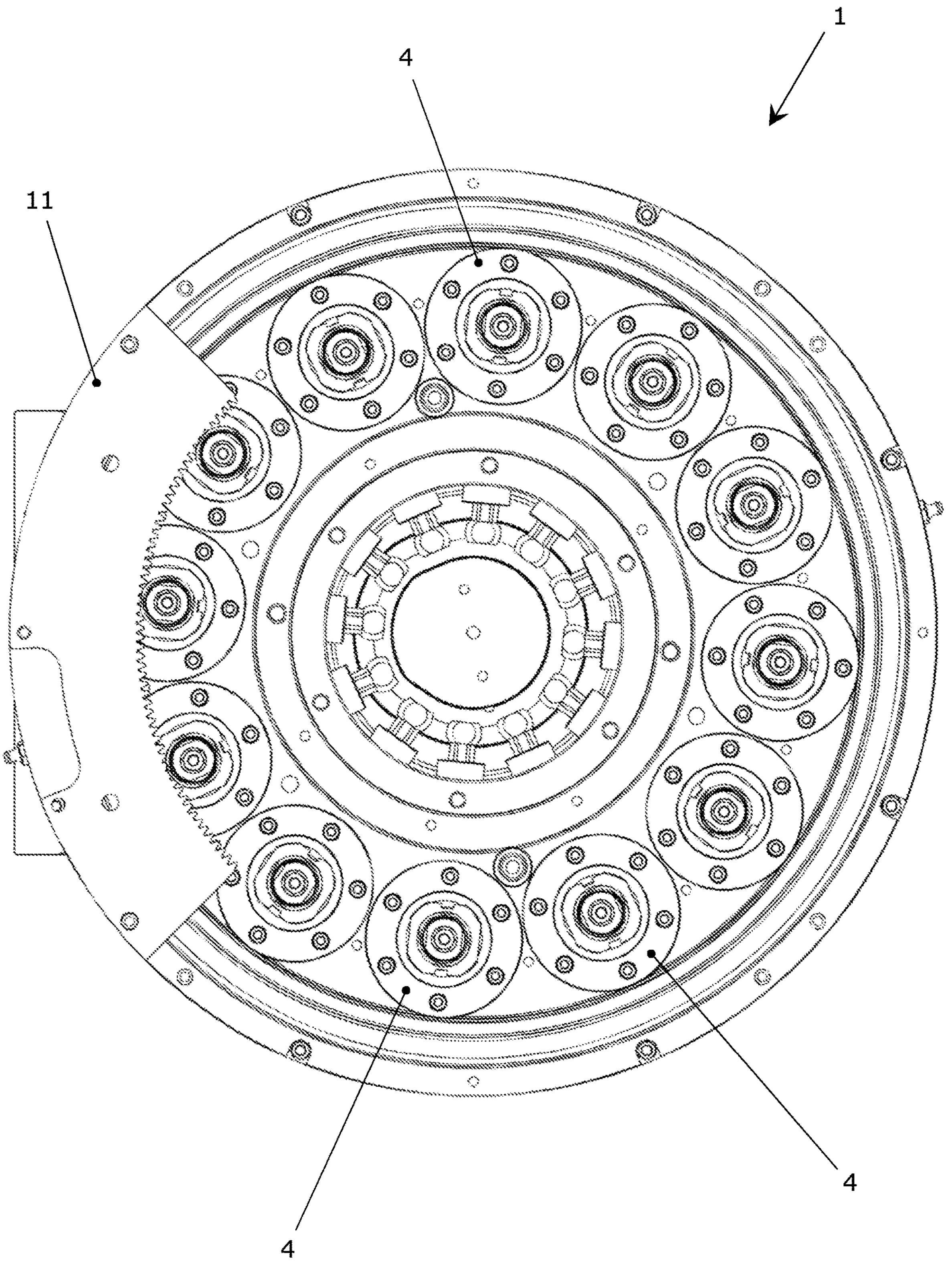
FIG. 17 is a top view of the cutting apparatus of FIG. 16.
Figure 18:
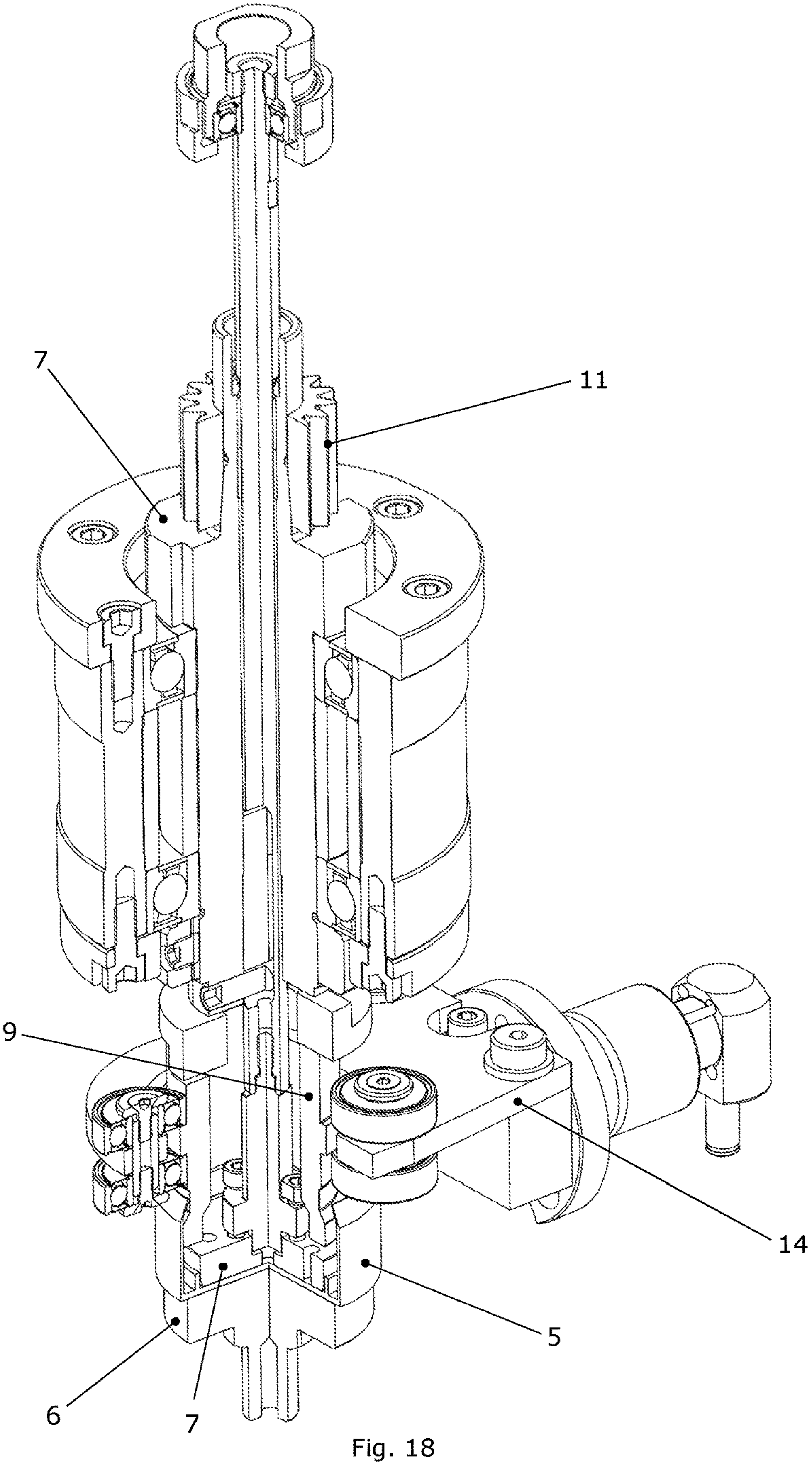
FIG. 18 is a perspective view in a partially sectioned vertical elevation of the cutting apparatus of FIG. 16.
Figure 19:
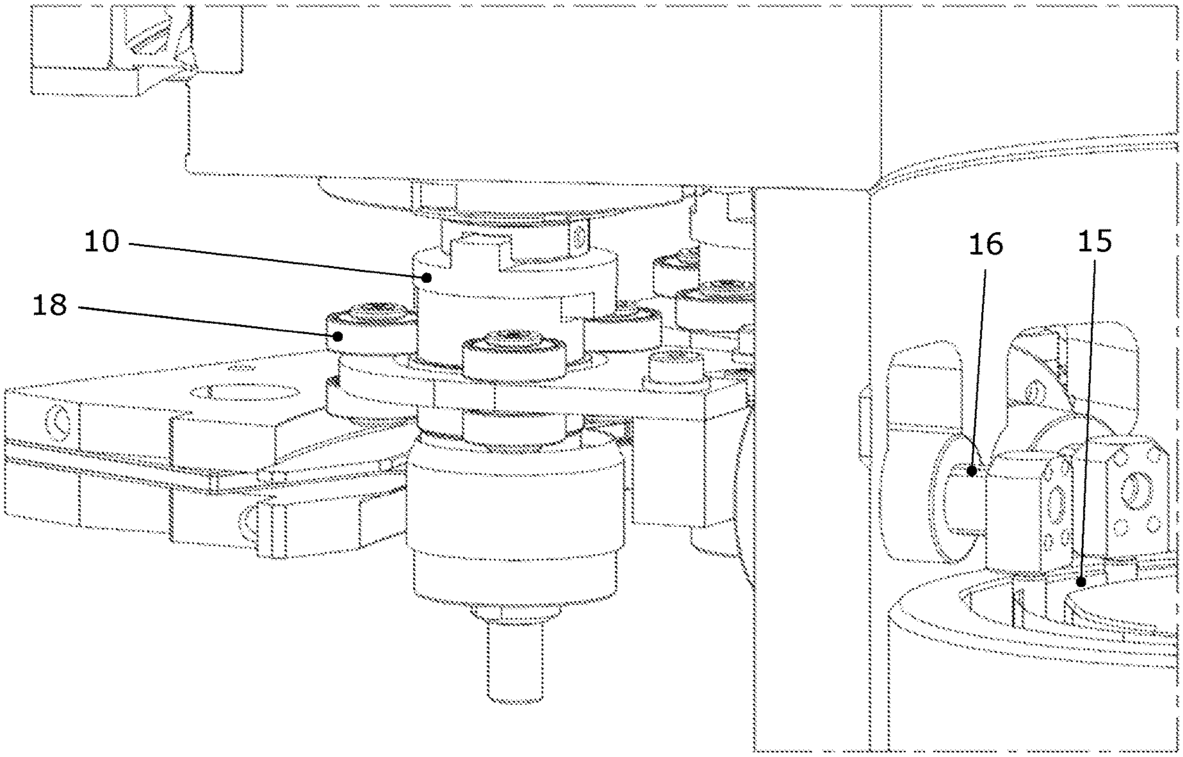
FIG. 19 is a partial perspective view of a detail of the cutting apparatus of FIG. 16 in which a misalignment joint transmits the rotation motion from a locking member to the respective abutment.
Figure 20:
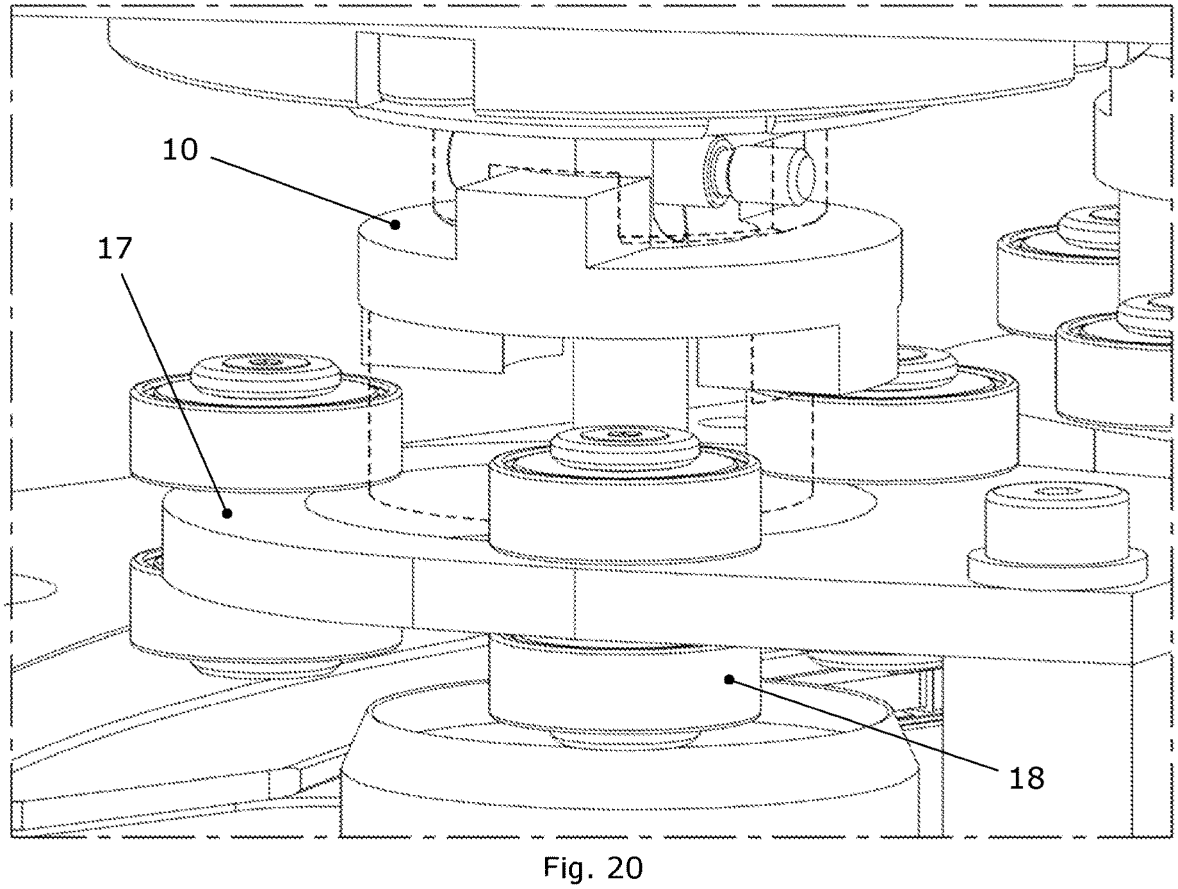
FIG. 20 shows an enlarged detail of FIG. 19.

The cutting apparatus 1 may comprise, in particular, a transmission 10 that is so configured that, for each transport g unit 4, a rotation of the locking member 7 around the upper axis causes a rotation of the respective abutment 9 around the abutment axis (see embodiment of FIG. 16).

The transmission 10 may comprise, in particular, a joint arranged between each locking member 7 and the respective abutment 9. The transmission 10 may comprise, in particular, a mechanical transmission arranged between each locking member 7 and the respective abutment 9. The transmission 10 may comprise, in particular, a misalignment joint and/or an elastic joint and/or an articulated joint. In the specific embodiment of the cutting apparatus of FIG. 16, the transmission 10 comprises an Oldham joint arranged between each locking member 7 and the respective abutment 9.

In practice, owing to the transmission 10, the rotation of each abutment 9 is controlled by the rotation of the respective locking member 7 (i.e. of the upper spindle). It is possible to provide, in particular, for the locking member 7 to be rotated around its upper axis by the motor 3 by a motion transmission system 11.

Figure 11:
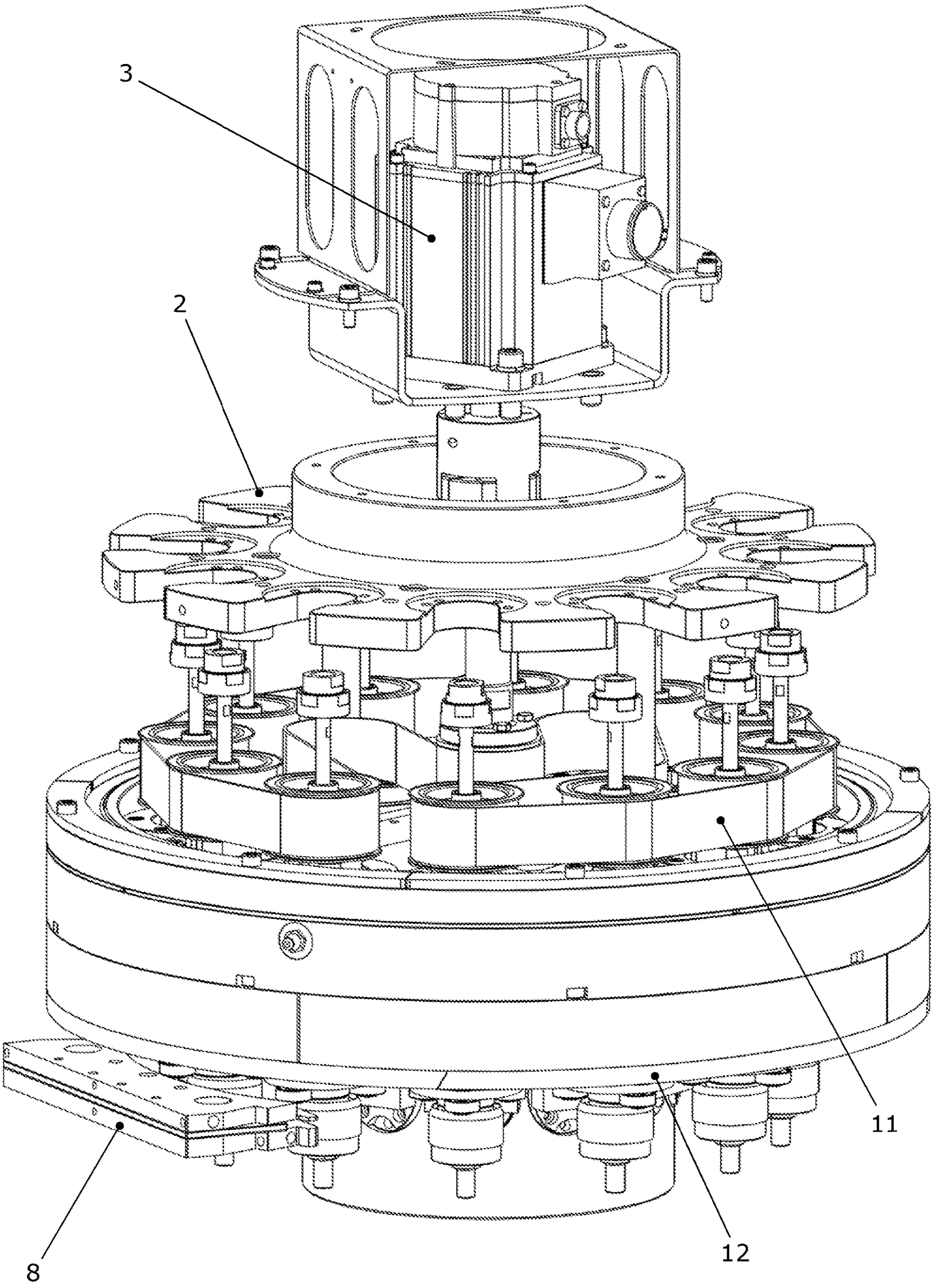
FIG. 11 is a perspective view of a second embodiment of a cutting apparatus made according to the invention, in which each annular abutment is rotatable around its rotation axis owing to a gear transmission that transmits the motion of the carousel to the axes of the various abutments.
Figure 12:
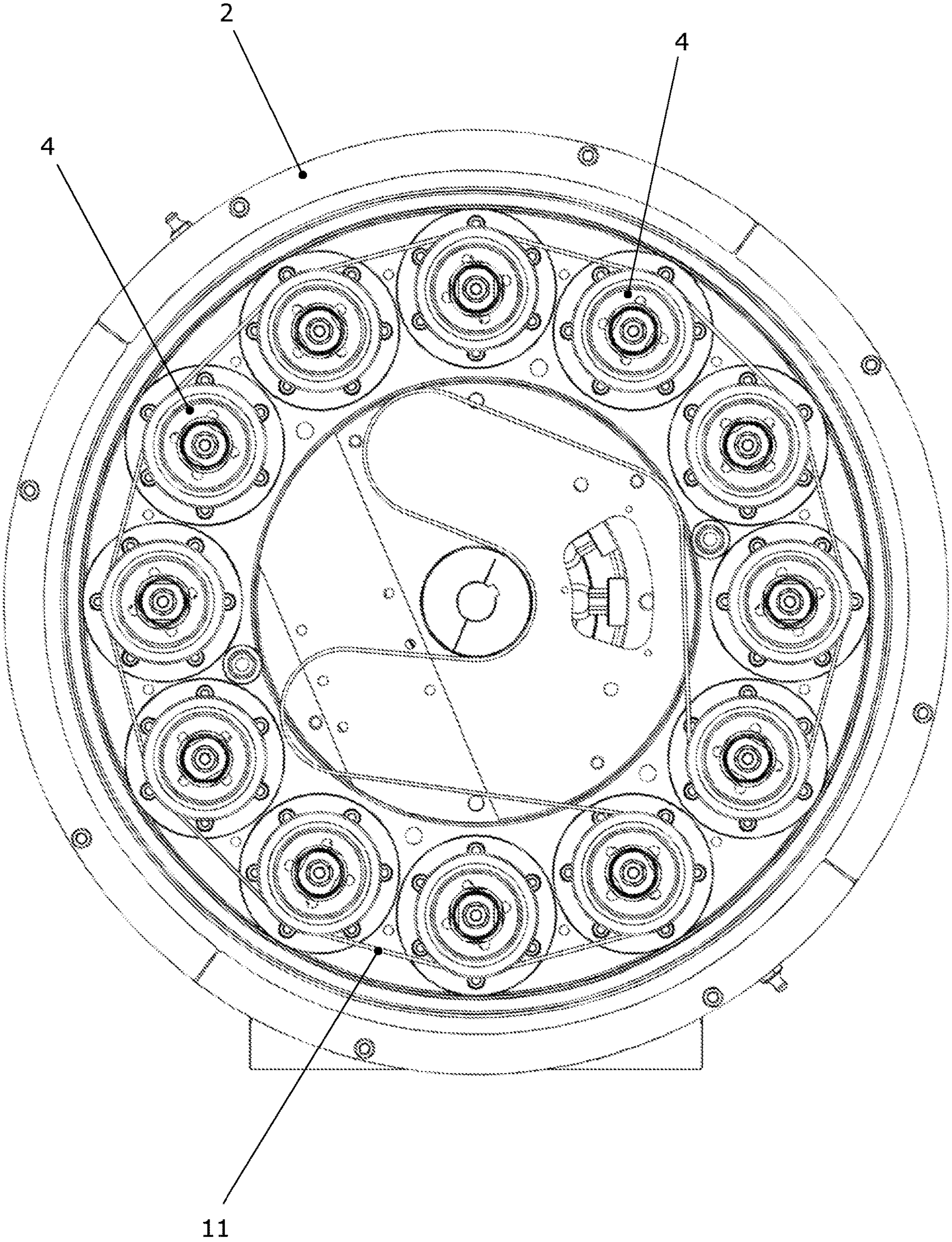
FIG. 12 is a top plan view of FIG. 11.
Figure 13:
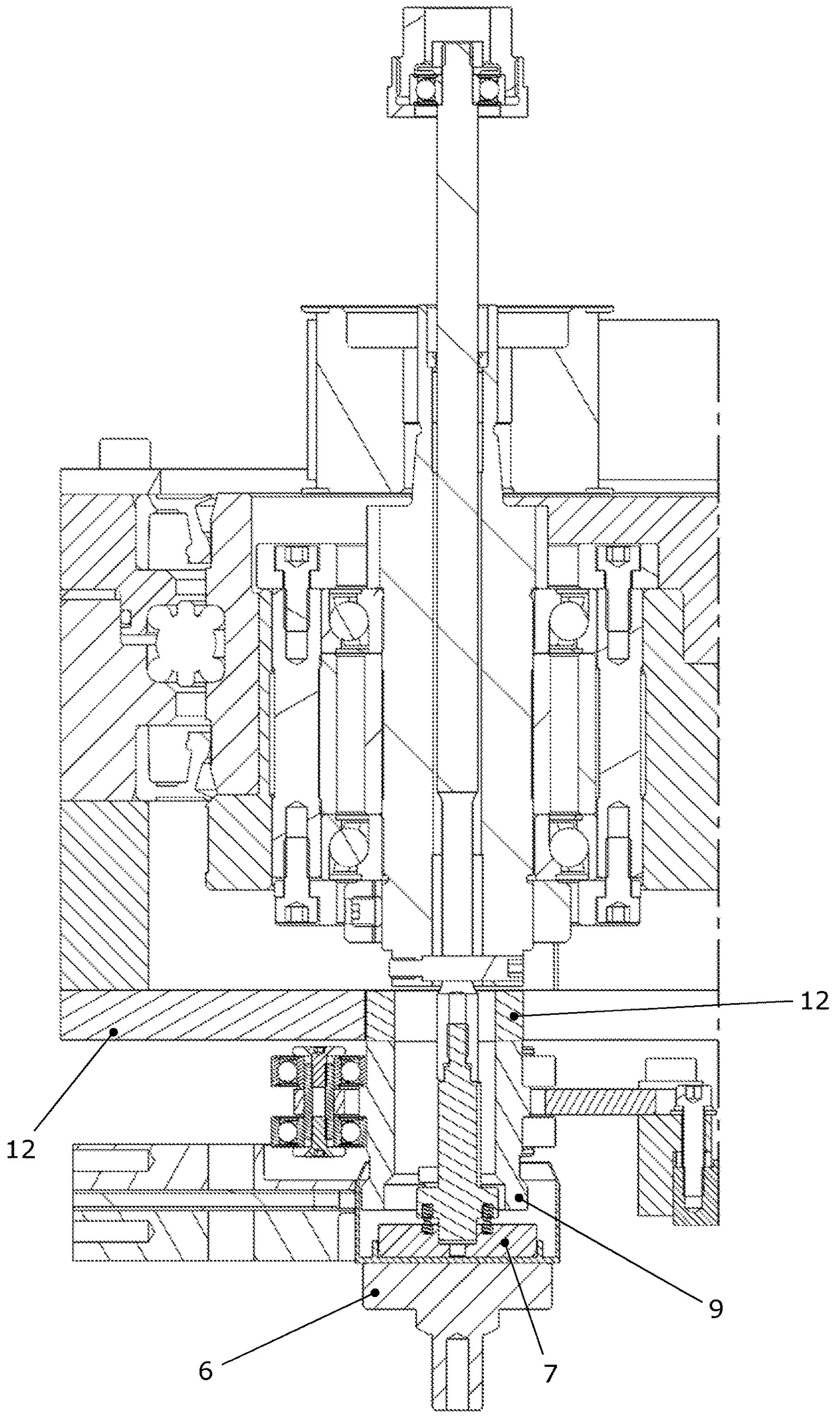
FIG. 13 is a section in a vertical elevation of the apparatus of FIG. 11.
Figure 14:
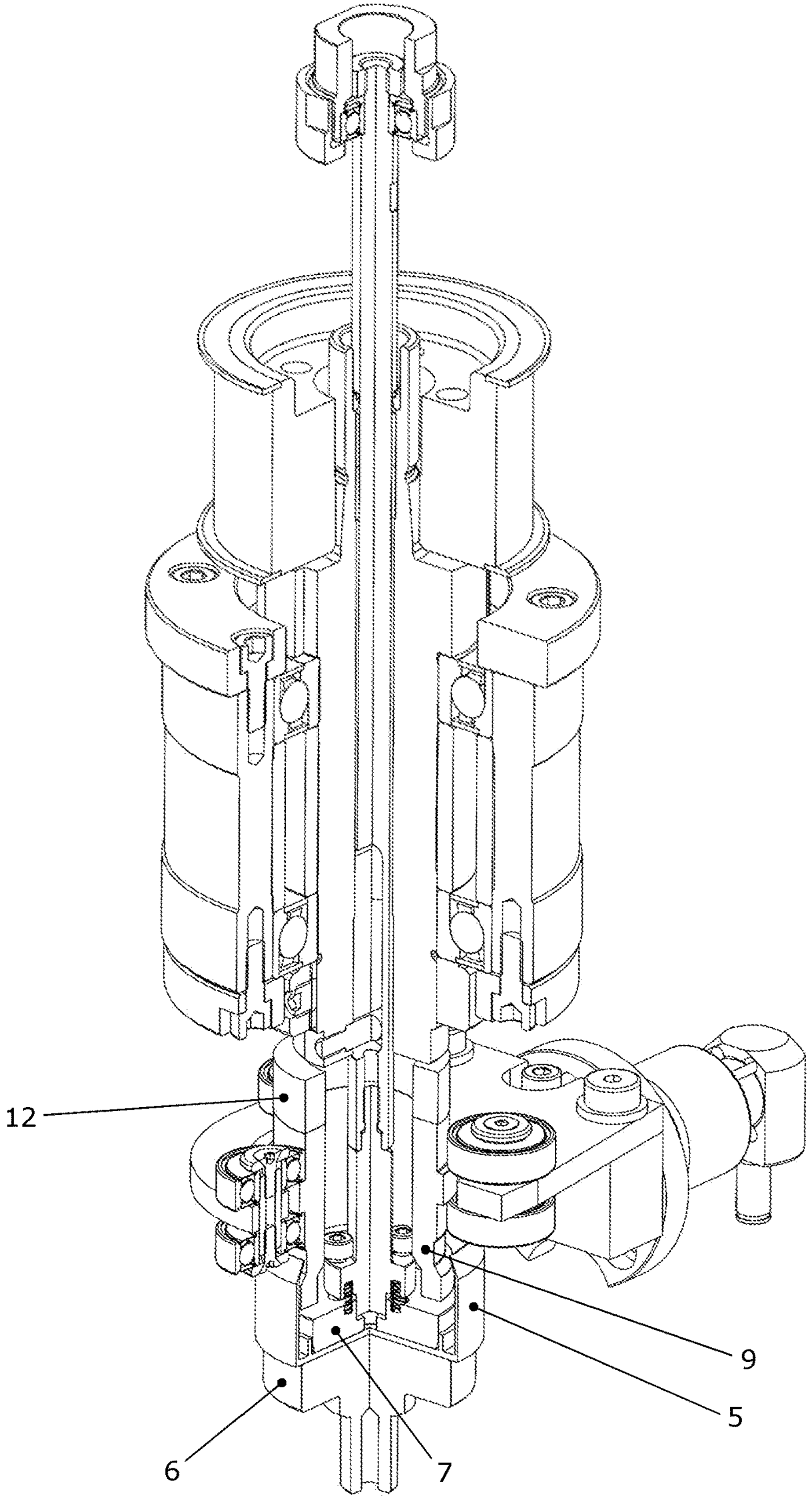
FIG. 14 is a perspective view in a partially sectioned vertical elevation of the cutting apparatus of FIG. 11.
Figure 15:
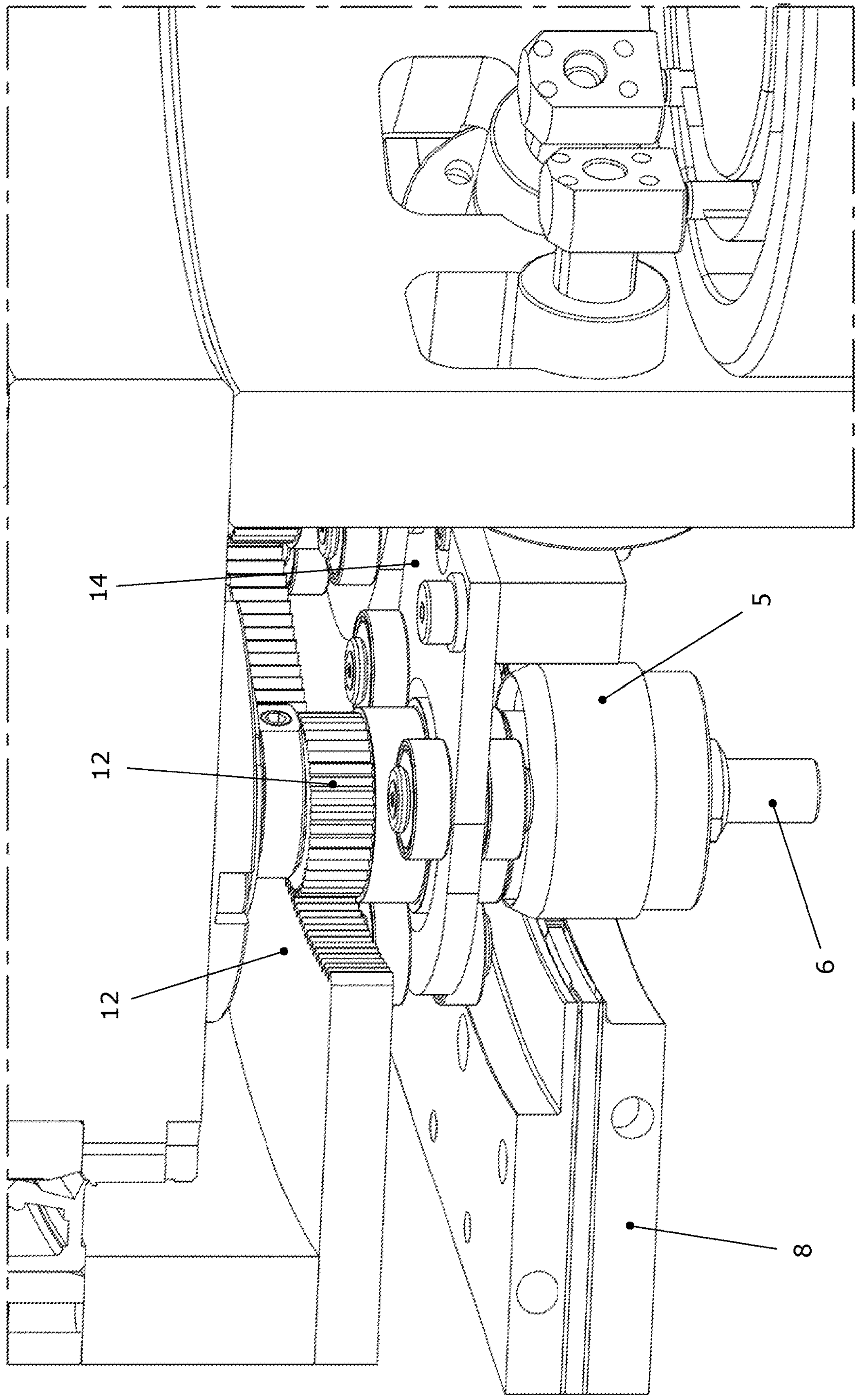
FIG. 15 is another perspective view of the apparatus of FIG. 11 in which the gear device with fixed crown gear that enables the rotation motion of the carousel to be transmitted to the various abutments.

The motion transmission system 11 may comprise, in particular, a mechanical transmission, for example of the gear type as in FIG. 16 and/or of the flexible member type as in FIG. 11.

The motion transmission system 11 may be configured, in particular, so as to transmit the motion from the rotation axis of a single rotor to a plurality of locking members 7, each around the respective upper axis.

In particular, the motion transmission system 11 may comprise (as in the embodiment of FIG. 16) a fixed crown gear and a plurality of cogs each of which is associated with a respective locking member 7, so that the rotation of each locking member 7 on itself is controlled by the rotation of the carousel 2 via a gear transmission for transmitting the motion.

The solution in which the abutment 9 is rotated by the rotation of the locking member 7, which can in turn be rotated by the carousel 2, may be suitable when the cutting device 8 has to make one or more vertical or oblique cuts. This solution in fact enables precise and effective "phasing" between the abutment 9 and the cutting device 8, where "phasing" means the control of the angular position of an element, which advances along a feeding path and at the same time rotates on itself, with respect to a fixed element.

It is also observed that this last advantage is also present in the solution in which the rotation of the abutment 9 is driven by a motion transmission device 12, as will be explained better below.

As said, the locking member 7 may be driven, in particular may be rotated by a motor connected by gearing, which enables a stable and constant transmission ratio to be obtained in any operating step, in particular both in an acceleration step, and in a deceleration step. Further, the motion supplied by the motor (for example the motor 3 independent of the motor of the carousel 2) may be transmitted not only to the locking member 7, but also to the abutment 9, as in the specific embodiment of FIG. 16.

It is possible to provide other embodiments (not illustrated)—particularly suitable for capsules that during the cutting step are guided in rolling by being coupled by friction or meshing (for example by knurling) with a fixed guide arranged next to the cutting device 8—in which the locking member 7 is not motor-driven, i.e. does not receive the motion from a motor but is substantially idling, whereas the abutment 9 is motor driven, i.e. receives the motion from a motor.

The cutting apparatus 1 may comprise, in particular, a motion transmission device 12 so configured that a rotation of each abutment 9, carried by the carousel 2, around the carousel axis, causes a rotation around the respective abutment axis directly, i.e. by a kinematic chain that does not include the locking member 7 (see the specific embodiment of FIG. 11).

The motion transmission device 12 may comprise, in particular, a mechanical transmission, for example of gear type (as in the illustrated embodiment of FIG. 11) and/or of flexible member type.

The motion transmission device 12 may comprise, in particular (see FIG. 11), a portion of fixed circular crown gear coaxial with the carousel axis and extending at least partially along a circumference. The motion transmission device 12 may comprise, in particular, for each abutment 9, a respective pinion that is integral and coaxial with the abutment 9 and coupled with the portion of crown gear, so that the movement of the carousel 2 around the carousel axis and the gear coupling between the portion of fixed crown gear and the pinions associated with the various abutments 9 determines a controlled rotation of each abutment 9 around its abutment axis.

The locking member 7 may be, in particular, as said previously, driven (i.e. rotated on itself by a motor), or rotatable in an idling manner around the respective upper axis.

In the specific embodiment of FIG. 11, the cutting apparatus 1 comprises the motion transmission system 11 that is configured to transmit the rotation motion from a single rotation axis to the upper axes of the locking members 7 and comprises at least one flexible transmission body (belt, chain, strap, etc). The aforesaid single rotation axis may be, in particular, the axis of a rotor of the motor 3, or the carousel axis around which the carousel 2 rotates, etc.

The cutting apparatus 1 may comprise, in particular (in embodiments that are not illustrated), for each transport unit 4, a motor for driving the respective upper axis and/or a motor for driving the respective abutment axis.

The carousel 2 may comprise, in particular, a carousel body 13 that is rotatable around the aforesaid (vertical) carousel axis. Each transport unit 4 may comprise, in particular, a support 14 rotated by the carousel body 13 and with which the respective abutment 9 is rotatably coupled.

The cutting apparatus 1 may comprise, in particular, a cam profile 15 arranged in a ring around the carousel axis. Each support 14 may comprise, in particular, at least one guide end coupled (slidingly) with the cam profile 15 so as to guide a movement of the support 14 in the aforesaid radial direction with respect to the respective locking member 7 (in particular with respect to the upper axis, i.e. the rotation axis of the locking member 7) in function of the angular position that it adopts in the rotation of the carousel 2.

Each support 14 may comprise, in particular, a sliding portion 16 and an annular portion 17. For each support 14, the guide end may be, in particular, radially more internal than the sliding portion 16, which in turn may be, in particular, radially more internal than the annular portion 17, where "radially" refers to the carousel axis.

The sliding portion 16 may be, in particular, slidingly coupled with the carousel body 13 along a sliding guide (for example a linear guide) in a radial direction. The annular portion 17 may be, in particular, arranged at least partially in a ring around the respective abutment 9 to rotatably support the abutment. The annular portion 17 can be, in particular, structured as a cantilever bracket projecting from the sliding portion 16.

For each transport unit 4, the respective abutment 9 may be, in particular, coupled rotatably with the respective support 14 around the respective abutment axis. Each abutment 9 may be, in particular, supported by the respective support 14 in the direction of the respective abutment axis (in particular, in a vertical direction) such that the weight of the abutment 9 bears down on the support 14 without bearing down on the respective locking member 7, both in a abutment position, and in an insertion position (for example, as in the embodiment of FIG. 1 or of FIG. 11). Basically, it is possible to provide for each transport unit 4 being configured to obtain a substantial absence of direct interactions (unless through the capsule 5 and the carousel body 13) between the abutment 9 and the locking member 7.

The cutting apparatus 1 may comprise, in particular, for each transport unit 4, a rotation support arrangement 18 interposed between the support 14 and the abutment 9. The rotation support arrangement 18 may be configured, in particular, to support at least the rotation of the abutment 9 around the abutment axis. The rotation support arrangement 18 may be configured, in particular, to support at least the reaction on the abutment 9 due to the action of the abutment 9 that presses the skirt portion of the capsule 5 against the cutting device 8. The rotation support arrangement 18 may be configured, in particular, to support at least the weight of the abutment 9.

For each transport unit 4, the annular portion 17 of the support 14 may, in particular, surround at least partially the respective abutment 9. The rotation support arrangement 18 may comprise, in particular, a circumferential arrangement of bearings angularly spaced apart from one another around the abutment axis such that the abutment 9 is surrounded by and can roll on, the aforesaid circumferential arrangement. Each bearing of the circumferential arrangement may be, in particular, supported by the support 14 around a respective bearing axis. Each bearing of the circumferential arrangement may be, in particular, provided with at least one outer ring in rolling contact with an outer surface of the respective abutment 9. The circumferential arrangement may define, in particular, the aforesaid abutment axis around which the respective abutment 9 rotates.

The circumferential arrangement may comprise, in particular, three or more pairs of bearings spaced angularly apart from one another around the aforesaid abutment axis (in the illustrated embodiments it comprises three pairs of bearings). Each pair of bearings may comprise, in particular, an upper bearing and a lower bearing that are coaxial with one another and provided, respectively, with an upper outer ring and with a lower outer ring. The respective abutment 9 may comprise, in particular, a circumferential protrusion inserted into a space comprised between the upper outer rings and the lower outer rings of the pairs of bearings of the circumferential arrangement.

For each transport unit 4, the respective abutment 9 may comprise, in particular, at least one bush-shaped portion with a geometric axis that is coaxial with the abutment axis and remains coaxial with the abutment axis both in the abutment position and in the insertion position.

For each transport unit 4, the respective abutment 9 may comprise, in particular, a martyr ring 19 made of expendable material and arranged to interact in contact with the cutting device 8 when the abutment 9 is in the abutment position and the skirt portion of the capsule 5 is cut by the cutting device 8.

For each transport unit 4, the respective abutment 9 may be configured, in particular, such that in the abutment position the abutment 9 is rotatable around the respective abutment axis without any direct contact surface with any surfaces of the respective locking member 7. It is possible to provide, in particular, for the contact and/or mechanical force transmission interactions between the abutment 9 and the locking member 7 being able to be transmitted only, in particular, through the capsule 5 and/or through the transmission 10 (for example the misalignment joint as in FIG. 16) and/or through the carousel body 13.

The carousel body 13, the support 14, the cam profile 15, the sliding portion 16, the annular portion 17, the rotation support arrangement 18 and the martyr ring 19 are present, by way of non-limiting example, in all three specific embodiments illustrated in the attached figures.

The cutting apparatus 1 in operation actuates a cutting method that may comprise, in particular, the step of transporting a capsule 5 along a path, in which the capsule comprises a closing portion for closing a container and a skirt portion for surrounding a neck of the container.

The cutting method may comprise, in particular, the step of cutting the skirt portion of the capsule 5 with a cutting device 8 whilst the capsule 5 advances along the path, rotates on itself and is retained between a locking member 7 inserted into the skirt portion and a base 6 opposite the locking member 7.

The cutting method may comprise, in particular, the step of transporting an abutment 9 along the aforesaid path, together with the capsule 5, in which the abutment 9 is arranged in a ring around a rotation axis of the locking member 7.

The cutting method may comprise, in particular, the step of moving the abutment 9 from an insertion position, in which the abutment 9 is inserted into the skirt portion of the capsule 5 (see the configuration passage from FIG. 8 to FIG. 9) before the skirt portion is cut, to an abutment position (see FIG. 6), in which the abutment 9 presses the skirt portion of the capsule 5 against the cutting device 8 so that the skirt portion is cut.

The abutment 9 can so rotate around a rotation axis that, when the abutment 9 is in the abutment position, it is misaligned with respect to the rotation axis of the locking member 7. It has been found that, owing to this misalignment between the abutment 9 and the locking member 7, the cutting operation is more precise, safe and reliable.

As said, the abutment 9 may be rotatable in an idling manner around the abutment axis, in particular to make at least one horizontal cut on the capsule 5, especially for a capsule devoid of knurling or another coupling device for coupling with a corresponding fixed guide device.

It is observed that the capsule 5 always maintains itself constantly coaxial with the locking member 7 (or upper spindle), so that it is possible pre-establish a desired transmission ratio for the system that transmits the motion to the various locking members 7, i.e. a transmission ratio particularly adjusted to the cutting method or mechanism that the cutting device 8 has to use on the capsules 5.

The apparatus and the cutting method in question may be advantageous, in particular, for a capsule 5 that is so shaped as not to enable a locking member (or tip) to be used that has a great diameter (for example because of the overall dimensions of the tip of the capsule 5), so that it is necessary to use a locking member with a relatively reduced diameter in order not to interfere with the capsule 5.

The apparatus and the cutting method in question enable the capsule 5 to be maintained concentric or coaxial with the locking member 7 and with the base 6, in which the capsule 5 can be rotated by the locking member 7 through frontal friction. The abutment 9 may be rotatably idling on itself, may act in the cutting zone as a lateral pressing member for pressing the capsule 5 against the cutting device 8 and for improving the performance of the cutting device 8.

As said, the abutment 9, instead of being rotatable in an idling manner, may be rotated by a motor-driven control system, in particular if the cutting device 8 has to perform vertical or oblique cuts. The control of the rotation of the abutment 9 permits phasing between the abutment 9 and the cutting device 8.

For this purpose, it has been seen that the abutment 9 may receive the rotation motion around the abutment axis from a motor (for example the motor 3, or other motor that is distinct and independent of the motor that rotates the axis of the carousel 2, or the motor that rotates the axis of the carousel 2) by of the locking member 7 (in which case the locking member 7 may be driven by the aforesaid motor by at least partially a gear transmission or another type of a transmission).

Alternatively, the abutment 9 may receive the rotation motion around the abutment axis from a motor (for example the motor 3, or other motor that is distinct and independent of the motor that rotates the axis of the carousel 2, or the motor that rotates the axis of the carousel 2) also without the medium of the locking member 7 (in which case the locking member 7 may be rotatably idling or driven by a motor by at least partially a gear transmission or another type of transmission).

As said, the abutment 9 may be driven by a motor (for example the motor 3, or other motor that is distinct and independent of the motor that rotates the axis of the carousel 2, or the motor that rotates the axis of the carousel 2) by at least partially a gear transmission for transmitting motion, as in the embodiment of FIG. 11.

It is in particular possible for the rotation of the abutment 9 around the abutment axis to be controlled by a motor-driven control system (to maintain phasing between the abutment 9 and the cutting device 8) and, further, a rotation that is independent of the rotation of the locking member 7, so that it is possible to control the rotation speed of the abutment 9 such that it is independent of the rotation speed of the locking member 7, which enables a significantly precise cut to be obtained for any type of capsule, also for capsules that are devoid of knurling.

The invention claimed is:

1. Apparatus for cutting capsules, wherein each capsule comprises a closure portion for closing a container and a skirt portion for surrounding a neck of the container, said apparatus comprising:

- a carousel rotatable around a carousel axis;
- two or more transport units carried by said carousel, each transport unit being configured to transport a capsule along a path defined by a rotation of said carousel, each transport unit comprising a base and a locking member arranged above said base, said base being rotatable about a lower axis and being configured to receive the capsule with the closure portion facing towards said base, said locking member being rotatable around an upper axis coaxial with said lower axis and being configured for insertion into the capsule inside the skirt portion so that the closure portion of the capsule can be retained between said locking member and said base;
- a cutting device arranged along said path for cutting the skirt portion of a capsule which is transported by the respective transport unit, and which rolls on said cutting device;
- for each transport unit, an abutment carried by said carousel and arranged around the upper axis of the respective locking member, said abutment being movable in a radial direction assuming an abutment position, in which the abutment can press the skirt portion of the capsule against said cutting device while the capsule rolls on said cutting device and the skirt portion is cut, and an insertion position, in which the abutment can be inserted into the skirt portion of the capsule before the skirt portion is cut;

wherein, for each transport unit, the respective abutment is rotatable around a respective abutment axis that is movable in said radial direction with respect to the respective upper axis, wherein the abutment axis is offset with respect to the upper axis when the abutment is in said abutment position;

wherein said carousel comprises a carousel body rotatable around said carousel axis and wherein each transport unit comprises a support carried by said carousel body and to which the respective abutment is rotatably coupled;

wherein said apparatus comprises, for each transport unit, a rotation support arrangement interposed between the support and the abutment and configured to support at least the rotation of the abutment around the abutment axis and/or the reaction on the abutment due to the action of the abutment which presses the skirt portion of the capsule against the cutting device and/or the weight of the abutment; and wherein, for each transport unit, the respective support comprises an annular portion which at least partially surrounds said abutment, said abutment being surrounded by said rotation support arrangement to roll thereon.

2. Apparatus according to claim 1, wherein, for each transport unit, the abutment is freely rotatable around the respective abutment axis.

3. Apparatus according to claim 1, comprising a transmission configured so that, for each transport unit, a rotation of the locking member about the upper axis causes a rotation of the respective abutment around the abutment axis, said transmission including a misalignment joint.

4. Apparatus according to claim 1, comprising a motor and a motion transmission system configured to transmit a rotational motion from said motor to each locking member around the respective upper axis; said motion transmission system comprising a mechanical transmission; said motor being distinct and operable independently from a motor which rotates said carousel axis.

5. Apparatus according to claim 1, comprising a motion transmission device configured so that a rotation of each abutment around the carousel axis causes a rotation of the abutment around the respective abutment axis.

6. Apparatus according to claim 1, wherein the locking member is freely rotatable around the respective upper axis.

7. Apparatus according to claim 1, comprising, for each transport unit, a motor configured to drive said locking member rotating around the respective upper axis and/or a motor configured to drive said abutment rotating around the respective abutment axis.

8. Apparatus according to claim 1, comprising a cam arrangement arranged annularly around said carousel axis, the respective support of each transport unit comprising at least one guide end coupled with said cam arrangement so as to guide a movement of the support in said radial direction with respect to the respective upper axis, each support comprising a sliding portion and an annular portion, said guide end being radially more internal than said sliding portion which is in turn radially more internal than said annular portion, said sliding portion being slidingly coupled with said carousel body along a sliding guide in said radial direction, said annular portion being structured as a cantilever bracket projecting from said sliding portion and being arranged annularly around the respective abutment to rotatably support said abutment.

9. Apparatus according to claim 1, wherein, for each transport unit, the respective abutment is rotatably coupled to the respective support about the respective abutment axis and is supported by the respective support in a direction of the respective abutment axis so that a weight of the abutment rests on said support without weighing on the respective locking member both in said abutment position and in said insertion position.

10. Apparatus according to claim 1, wherein said rotation support arrangement comprises a circumferential arrangement of bearings angularly spaced from each other around said abutment axis, each bearing of said circumferential arrangement being supported by said annular portion around a respective bearing axis and being provided with at least one outer ring in rolling contact with an external surface of the respective abutment, whereby said circumferential arrangement defines said abutment axis around which the respective abutment can rotate.

11. Apparatus according to claim 10, wherein said circumferential arrangement comprises three or more pairs of bearings angularly spaced from each other about said abutment axis, each pair of bearings comprising an upper bearing and a lower bearing coaxial with each other and provided, respectively, of an upper outer ring and of a lower outer ring, the respective abutment comprising a circumferential projection inserted in a space between the upper outer rings and the lower outer rings of said three or more pairs of bearings of said circumferential arrangement.

12. Apparatus according to claim 1, wherein, for each transport unit, the respective abutment comprises at least a bush portion coaxial with said abutment axis both in said abutment position and in said insertion position.

13. Apparatus according to claim 1, wherein, for each transport unit, the respective abutment comprises a martyr ring arranged to interact in contact with said cutting device when the abutment is in said abutment position and the skirt portion of the capsule is cut by said cutting device.

14. Apparatus according to claim 1, wherein, for each transport unit, the respective abutment in said abutment position is rotatable about the respective abutment axis without any surface in direct contact with any surface of the respective locking member.

15. Cutting method for the apparatus according to claim 1, said cutting method comprising the steps of:

carrying a capsule along a path, said capsule comprising a closure portion for closing a container and a skirt portion for surrounding a neck of the container;

cutting the skirt portion of the capsule with a cutting device while the capsule rotates and is held between a locking member inserted in the skirt portion and a base opposite the locking member;

carrying an abutment along said path, said abutment being arranged around an axis of rotation of the locking member;

moving said abutment from an insertion position, in which the abutment is inserted in the skirt portion of the capsule before the skirt portion is cut, to an abutment position, in which the abutment presses the skirt portion of the capsule against said cutting device while the skirt portion is cut;

wherein the abutment rotates around an axis of rotation which, when the abutment is in said abutment position, is offset with respect to said rotation axis of the locking member.

* * * * *